(12) United States Patent
Tang et al.

(10) Patent No.: US 9,292,476 B2
(45) Date of Patent: Mar. 22, 2016

(54) FOURIER TRANSFORM COMPUTATION FOR DISTRIBUTED PROCESSING ENVIRONMENTS

(71) Applicant: Intel Corporation, Santa Clara, CA (US)

(72) Inventors: Ping Tak Peter Tang, Edison, NJ (US); Jong Soo Park, San Jose, CA (US); Vladimir Petrov, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 489 days.

(21) Appl. No.: 13/648,804

(22) Filed: Oct. 10, 2012

(65) Prior Publication Data

US 2014/0101219 A1   Apr. 10, 2014

(51) Int. Cl.
*G06F 17/14* (2006.01)

(52) U.S. Cl.
CPC ................................ *G06F 17/142* (2013.01)

(58) Field of Classification Search
None
See application file for complete search history.

(56) References Cited

U.S. PATENT DOCUMENTS

| | | | | |
|---|---|---|---|---|
| 5,751,616 | A * | 5/1998 | Hegland et al. | 708/401 |
| 6,208,946 | B1 * | 3/2001 | Arakawa et al. | 702/77 |
| 2001/0036228 | A1 * | 11/2001 | Skafidas et al. | 375/232 |
| 2010/0088356 | A1 * | 4/2010 | Lloyd et al. | 708/404 |

OTHER PUBLICATIONS

Agarwal et al., "A High Performance Parallel Algorithm for 1-D FFT," IEEE 1994 (7 pages).
Bailey, David H., "FFTs in External or Hierarchical Memory," Journal of Supercomputing, vol. 4, No. 1, Mar. 1990 (15 pages).
Ballard et al., "Graph Expansion and Communication Costs of Fast Matrix Multiplication," Proceedings of the 23rd Annual ACM Symposium on Parallel Algorithms and Architectures, 2011 (11 pages).
Ballard et al., "Minimizing Communication in Numerical Linear Algebra," Siam J. Matrix Anal. & Appl., vol. 32, No. 3, 2011 (36 pages).
Benedetto et al., "Sampling Multipliers and the Poisson Summation Formula," The Journal of Fourier Analysis and Applications, vol. 3, No. 5, 1997 (21 pages).
Bruno et al., "Prescribed Error Tolerances Within Fixed Computational Times for Scattering Problems of Arbitrarily High Frequency: The Convex Case," 2004 (16 pages).
Cooley et al., "An Algorithm for the Machine Calculation of Complex Fourier Series," researched in part at Princeton University under the sponsorship of the Army Reseach Office (Durham), Aug. 17, 1964 (5 pages).

(Continued)

*Primary Examiner* — Michael D Yaary
(74) *Attorney, Agent, or Firm* — Hanley, Flight & Zimmerman, LLC

(57) ABSTRACT

Fourier transform computation for distributed processing environments is disclosed. Example methods disclosed herein to compute a Fourier transform of an input data sequence include performing first processing on the input data sequence using a plurality of processors, the first processing resulting in an output data sequence having more data elements than the input data sequence Such example methods also include performing second processing on the output data sequence using the plurality of processors, the output data sequence being permutated among the plurality of processors, each of the processors performing the second processing on a respective permutated portion of the output data sequence to determine a respective, ordered segment of the Fourier transform of the input data sequence.

19 Claims, 12 Drawing Sheets

(56) References Cited

OTHER PUBLICATIONS

Demmel et al., "Avoiding Communication in Sparse Matrix Computations," IEEE, 2008 (12 pages).
Doi et al., "Overlapping Methods of All-to-All Communication and FFT Algorithms for Torus-Connected Massively Parallel Supercomputers," SC10, New Orleans, Louisiana, Nov. 2010 (9 pages).
Dutt et al., "Fast Fourier Transforms for Nonequispaced Data, II," Applied and Computational Harmonic Analysis 2, Academic Press, Inc., 1995 (16 pages).
Edelman et al., "The Future Fast Fourier Transform?," Society for Industrial and Applied Mathematics, Siam J. Sci. Comput., vol. 20, No. 3, 1999 (23 pages).
Fessler et al., "Nonuniform Fast Fourier Transforms Using Min-Max Interpolation," IEEE Transactions on Signal Processing, vol. 51, No. 2, Feb. 2003 (15 pages).
Franchetti et al., "Discrete Fourier Transform on Multicore: A Review of Optimizations Necessary for Good Multicore Performance," IEEE Signal Processing Magazine, Nov. 2009, downloaded on Mar. 18, 2010 (13 pages).
Frigo et al., "The Design and Implementation of FFTW3," 2005 (16 pages).
Govindaraju et al., "High Performance Discrete Fourier Transforms on Graphics Processors," SC2008, Austin, Texas, Nov. 2008 (12 pages).
Hassanieh et al., "Nearly Optimal Sparse Fourier Transform,", 2012 (28 pages).
Hassanieh et al., "Simple and Practical Algorithm for Sparse Fourier Transform," SIAM, 2012 (12 pages).
Intel, "Performance: Ready to Use," Intel Math Kernel Library (Intel MKL) 11.0, Industry-Leading High Performance Math Library, <http://software.intel.com/en-us/intel-mkl> downloaded on Oct. 9, 2012 (3 pages).
Kumar et al., "Optimization of All-to-all Communication on the Blue Gene/L Supercomputer," IEEE 37th International Conference on Parallel Processing, 2008 (10 pages).
Liu et al., "A VLSI Array Processing Oriented Fast Fourier Transform Algorithm and Hardware Implementation," GLSVLSI'05, Chicago, Illinois, Apr. 17-19, 2005 (5 pages).
Marino et al., "Parallel Implementation of Multidimensional Transforms without Interprocessor Communication," IEEE Transactions on Computers, vol. 48, No. 9, Sep. 1999 (11 pages).
Namneh et al., "Communication Efficient Adaptive Matrix Transpose Algorithm for FFT on Symmetric Multiprocessors," IEEE, 2005 (4 pages).
Namneh et al., "Parallel Implementations of 1-Dfast Fourier Transform Without Interprocessor Communication," International Journal of Computers and Applications, vol. 29, No. 2, 2007 (7 pages).
Potts et al., "Chapter 1—Fast Fourier Transforms for Nonequispaced Data: A Tutorial," 2001, (23 pages).
Song et al., "Scalable Tile Communication-Avoiding QR Factorization on Multicore Cluster Systems," SC10, New Orleans, Louisiana, Nov. 2010 (11 pages).
Tang et al., "A Framework for Low-Communication 1-D FFT," expected to be published at The International Conference for High Performance Computing, Networking, Storage and Analysis, SC12, Nov. 10-16, 2012 (12 pages).
David S. Scott, "Efficient All-to-All Communication Patterns in Hypercube and Mesh Topologies", IEEE, 1991 (pp. 398-403).
A. Dutt and V. Rokhlin, "Fast Fourier Transforms for Nonequispaced Data", Siam J. Sci Comput. vol. 14, No. 6, pp. 1368-1393, Nov. 1993 (26 pages).
W. M. Gentleman, "Fast Fourier Transforms—For Fun and Profit", Bell Telephone Laboratories, 1966 (pp. 563-578).
Heideman, et al., "Gauss and the History of the Fast Fourier Transform", IEEE ASSP Magazine, Oct. 1984 (pp. 14-21).
Lu, et al., "A Hybrid Parallel M-D FFT Algorithm Without Interprocessor Communication", IEEE, 1993 (pp. 281-284).
Gertner, et al., "A Parallel Algorithm for 2-D DFT Computation with No Interprocessor Communication", IEEE Transactions on Parallel and Distributed Systems, vol. 1, No. 3, Jul. 1990 (pp. 377-382).
Daisuke Takahashi, "A parallel 1-D FFT algorithm for the Hitachi SR8000", Parallel Computing, 2003 (pp. 679-690).
Agullo et al., "QR Factorization of Tall and Skinny Matrices in a Grid Computing Environment," 2010 (10 pages).

\* cited by examiner

700 ⬎

```
loop_a over M'/μP chunks // same matrix elements
  loop_b over μ rows // same input range
    loop_c over B blocks // inner product
      loop_d over P elements in each block
```

FOURIER TRANSFORM COMPUTATION FOR DISTRIBUTED PROCESSING ENVIRONMENTS

FIELD OF THE DISCLOSURE

This disclosure relates generally to Fourier transforms and, more particularly, to Fourier transform computation for distributed processing environments.

BACKGROUND

Fast Fourier transform (FFT) algorithms are computational tools that are widely used for calculating the discrete Fourier transform (DFT) of input data sequences. Most prior FFT algorithms focus on factoring the DFT matrix algebraically into sparse factors, thereby reducing the arithmetic cost associated with the DFT from an order $N^2$ arithmetic cost, represented mathematically as $O(N^2)$, to an $O(N \log N)$ arithmetic cost, where N is the number of elements in the input data sequence. However, other types of costs, in addition to the arithmetic cost, can affect the performance of an FFT algorithm, especially in today's high-performance, distributed computing environments.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
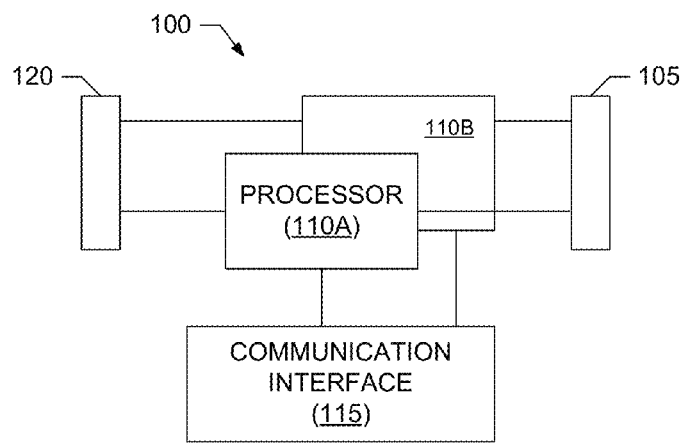
FIG. 1 is a block diagram of an example distributed processing system capable of performing distributed Fourier transform computation as disclosed herein.

Fourier transform computation for distributed processing environments is disclosed herein. Example methods to compute a Fourier transform of an input data sequence in a distributed processing environment, as disclosed herein, include performing first processing on the input data sequence using multiple processors. In such examples, the first processing results in a first output data sequence having more data elements than the input data sequence. Such example methods also include performing second processing on the first output data sequence (e.g., obtained from the first processing) using the multiple processors. In such examples, the first output data sequence is permutated among the multiple processors. Furthermore, each of the processors performs the second processing on a respective permutated portion of the first output data sequence to determine a respective, ordered segment of the Fourier transform of the input data sequence.

In some examples, the input data sequence is received by the method in-order, the Fourier transform of the input data sequence is output by the method in-order, and the method further comprises performing only one global data transpose between the first processing and the second processing.

In some examples, the first processing performed on the input data sequence includes convolving the input sequence with a window function, and performing Fourier transforms on respective segments of a second output data sequence resulting from convolving the input sequence with the window function. In some examples, the window function is specified by an alias error and a condition number. In some such examples, an accuracy of the Fourier transform of the input data sequence is based on the alias error, the condition number and an amount of data oversampling exhibited by the first processing.

In some examples, a first one of the processors performs the first processing on a segment of the input data sequence. In such examples, a respective portion of the first output data sequence resulting from the first processing performed by the first one of the processors includes more data elements than are in the first segment of the input data sequence. For example, the output data sequence resulting from the first processing performed by the multiple processors can include substantially twenty-five percent more data elements than are in the input data sequence.

In some examples, the second processing performed by each processor on the processor's respective permutated portion of the first output data sequence (e.g., obtained from the first processing) includes performing a Fourier transform on the respective permutated portion of the first output data sequence. The second processing in such examples also includes demodulating, based on a window function, a second output data sequence resulting from performing the Fourier transform on the respective permutated portion of the first output data sequence. In some such examples, the second processing performed by each processor on the processor's respective permutated portion of the first output data sequence further includes discarding a portion of the second output data sequence prior to demodulating the second output data sequence based on the window function. In such examples, the portion of the second sequence of data that is discarded corresponds to an amount of data oversampling associated with the first processing, where the data oversampling results in the first output data sequence having more data elements than the input data sequence.

These and other example methods, apparatus, systems and articles of manufacture (e.g., physical storage media) to implement Fourier transform computation for distributed processing environments are disclosed in greater detail below.

As mentioned above, most prior FFT algorithms focus on reducing arithmetic cost. However, in today's high-performance, distributed computing environments, other types of costs, in addition to the arithmetic cost, can affect the performance of an FFT algorithm. For example, communication cost, which is the cost associated with moving data among processing nodes, can be a dominant cost in a distributed computing environment. For example, in prior one-dimensional (1-D) FFT algorithms implemented in a distributed computing environment, internode communication in the form of all-to-all data exchanges (also called global transposes, in which data from each processing node is to be exchanged among all of the processing nodes) can account for 50% to 90% (or more) of the overall execution time. Many industry-standard FFT algorithms execute three instances of global transposes because such triple-all-to-all data exchanges are used by these algorithms to achieve in-order 1-D FFT processing in which the natural order of the input and output data is preserved. The number of global transposes can be reduced if out-of-order data can be accommodated, such as when the FFT is used to compute a convolution. However, when in-order FFTs are preferred, prior techniques for mitigating the performance consequences of these three global transposes have focused on higher dimensional FFTs, or have introduced substantially higher arithmetic costs (e.g., above the $O(N \log N)$ arithmetic costs associated with typical FFT algorithms).

Unlike such prior FFT algorithms that rely on three global data transposes, example distributed Fourier transform processing, as disclosed herein, utilizes only one global data transpose, resulting in reduced communication costs relative to prior FFT algorithms, at least in some instances. Furthermore, at least some examples of distributed Fourier transform processing, as disclosed herein, can achieve arithmetic costs similar to the $O(N \log N)$ arithmetic costs of prior FFT algorithms. Thus, relative to prior FFT algorithms, distributed Fourier transform processing, as disclosed herein, can provide substantial improvements in communication cost performance while still achieving the arithmetic cost performance expected of an FFT algorithm.

Turning to the figures, a block diagram of an example distributed processing system 100 capable of implementing distributed Fourier transform processing, as disclosed herein, is illustrated in FIG. 1. The distributed processing system 100 of FIG. 1 includes an example input interface 105 to receive or otherwise obtain an input data sequence for which a Fourier transform is to be computed. In the illustrated example, the input interface 105 receives or otherwise obtains the input data sequence in-order or, in other words, such that the original temporal ordering of the input data sequence is preserved. The input interface 105 can be implemented by any type(s) and/or number of communication interfaces. For example, the input interface 105 can be implemented by the example interface circuit 1620 of FIG. 16, which is described in greater detail below. The input interface 105 can also include one or more data storage and/or memory elements, such as the example mass storage device 1630 and/or the example volatile memory 1618 of FIG. 16, and/or any other type(s) and/or number of data storage and/or memory elements, to store the input data sequence for subsequent processing.

The distributed processing system 100 of the illustrated example also includes example processors 110A-B and an example communication interface 115 to enable data to be exchanged among the multiple processors 110A-B. The multiple processors 110A-B can be implemented by any type(s) and/or number of processors, such as one or more processor cores, one or more multicores, one or more processing nodes, etc. For example, one or more of the multiple processors 110A-B can be implemented by the example processor 1612 of FIG. 16, which is described in greater detail below. Also, some or all of the multiple processors 110A-B can be included in the same hardware platform, or one or more, or all, of the multiple processors 110A-B can be included in different hardware elements, such as in separate racks of a supercomputer, in separate computer platforms connected by a network, etc. The communication interface 115 can be implemented by any type(s) and/or number of data communication interfaces capable of interconnecting the multiple processors 110A-B. For example, the communication interface 115 can be implemented by one or more communication busses, switching fabrics, data backplanes, point-to-point links, etc. As described in greater detail below, the multiple processors 110A-B and the communication interface 115 can be used to perform distributed Fourier transform processing on the input data sequence obtained via the input interface 105. As further described below, such distributed Fourier transform processing involves performing just one one global data transpose among the multiple processors 110A-B.

The example distributed processing system 100 of FIG. 1 further includes an example output interface 120 to output or otherwise provide an output data sequence that is the Fourier transform of the input sequence obtained via the input interface 105. The Fourier transform output sequence provided at the output interface 120 of the illustrated example is determined via the distributed Fourier transform processing performed by the multiple processors 110A-B and the communication interface 115, as described in greater detail below. In the illustrated example, the output interface 120 outputs or otherwise provides the resulting Fourier transform of the input data sequence in-order or, in other words, such that the natural frequency ordering of the Fourier transform sequence is preserved. The output interface 120 can be implemented by any type(s) and/or number of communication interfaces. For example, the output interface 120 can be implemented by the example interface circuit 1620 of FIG. 16, which is described in greater detail below. The output interface 120 can also include one or more data storage and/or memory elements, such as the example mass storage device 1630 and/or the example volatile memory 1618 of FIG. 16, and/or any other type(s) and/or number of data storage and/or memory elements, to store the output Fourier transform data sequence for subsequent processing, retrieval, etc.

Although one input interface 105, two processors 110A-B, one communication interface 115 and one output interface 120 are shown in the example of FIG. 1, the distributed processing system 100 can include any number of input interface(s) 105, processor(s) 110A-B, communication interface(s) and/or output interface(s) for use in performing distributed Fourier transform processing.

Figure 2:
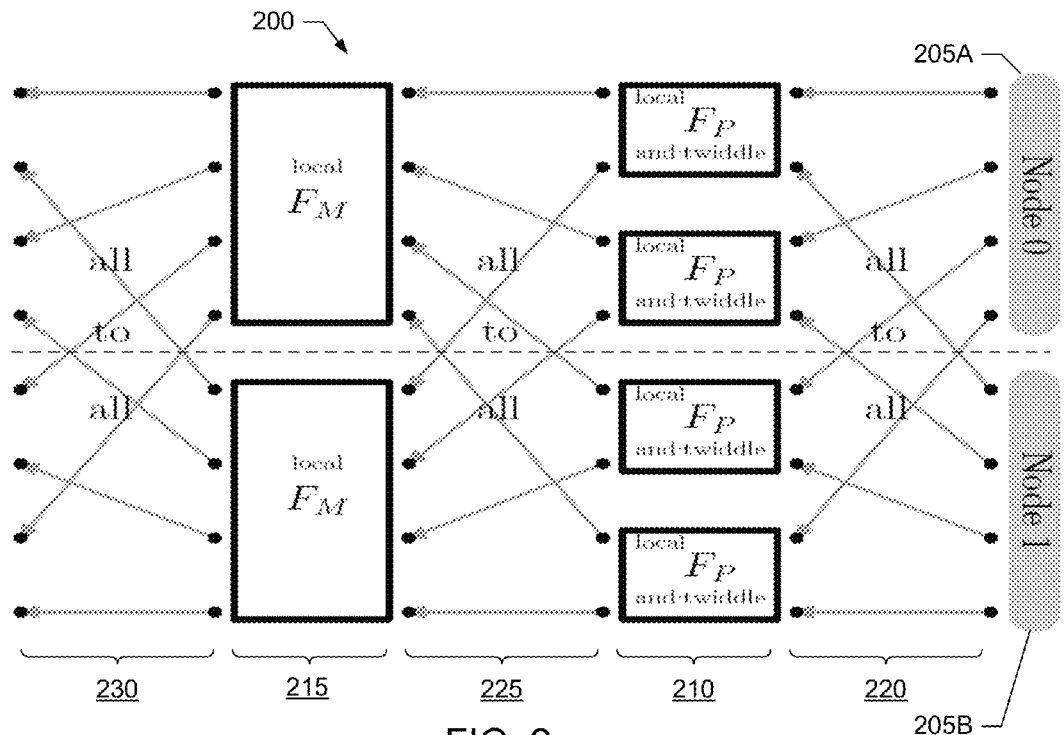
FIG. 2 is a block diagram of an example prior FFT implementation.

To provide context for a discussion of distributed Fourier transform processing as disclosed herein, an example prior, parallel FFT algorithm 200 for a distributed processing environment is illustrated in FIG. 2. The example prior FFT algorithm 200 determines an FFT for N=MP input data points by decomposing the FFT computation into two tasks performed by each processing node 205A, B. The first task 210 computes M sets of length-P FFTs, followed by elementwise scaling commonly called twiddle-factor multiplication. The second task 215 computes P sets of length-M FFTs. As illustrated in FIG. 2, this decomposition also involves three all-to-all data exchanges 220, 225 and 230 if data order is to be preserved.

Figure 3:
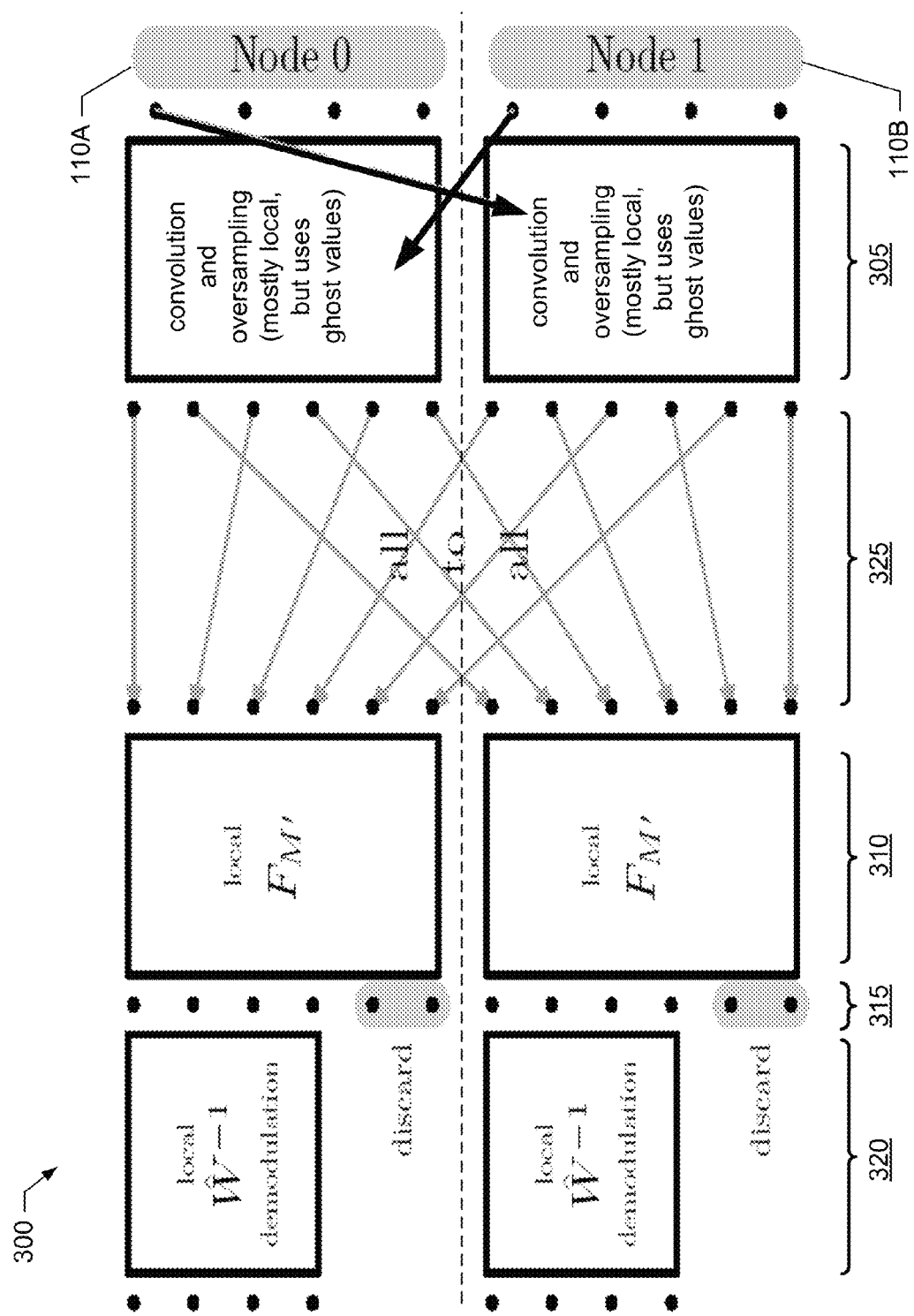
FIG. 3 is a block diagram of a disclosed, example distributed FFT processor that can be implemented by the distributed processing system of FIG. 1.

An example distributed FFT processor 300 that can perform distributed FFT processing as disclosed herein is illustrated in FIG. 3. In the illustrated example of FIG. 3, the distributed FFT processor 300 is implemented using two of the processors 110A-B of the distributed processing system 100. However, as described below, the distributed FFT processor could be implemented using any number of processors.

Unlike the three all-to-all data exchanges 220, 225 and 230 utilized by the prior FFT algorithm 200, the distributed FFT processing performed by the distributed FFT processor 300 of FIG. 3 is based on an FFT decomposition that involves just one all-to-all data exchange (or, in other words, just one global data transpose). The distributed FFT decomposition implemented by the distributed FFT processor 300 includes two main tasks performed by each processor 110A, B. The first task is a convolution process (or a filtering process) performed by an example window convolver 305 implemented by or otherwise included in the distributed FFT processor 300. In the illustrated example, the first processing task receives or otherwise obtains an input data sequence in-order or, in other words, such that the original temporal ordering of the input data sequence is preserved, and generally results in an output data sequence having more data points N', where N'=M'P>N, than in the input data sequence. This data size inflation is referred to herein as oversampling. In some examples, the oversampling amount is a design parameter chosen independent of N. For example, the oversampling amount can be selected to be 25% or some other amount.

The second task performed by each processor 110A, B involves computing P sets of length-M' FFTs using an example FFT processor 310, discarding portions of the FFT output sequences (e.g., due to the oversampling performed by the window convolver 305) using an example data discarder 315, and performing a demodulation process involving elementwise scaling using an example data demodulator 320. In the illustrated example, the data demodulator 320 outputs or otherwise provides a resulting FFT output sequence for the input data sequence that is in-order or, in other words, in which the natural frequency ordering of the FFT sequence is preserved. The example distributed FFT processor 300 of FIG. 3 also includes an example data permutator 325 to perform a single all-to-all data exchange (e.g., a global data transpose) between the first and second tasks. While internode communication is also utilized during the convolutional processing performed by the window convolver 305, that amount of internode communication is negligible (and does not rise to the level of an all-to-all data exchange) as each processing node 110A-B uses just a small amount of data from its neighboring processing node 110A-B (as illustrated in FIG. 3).

Figure 4:
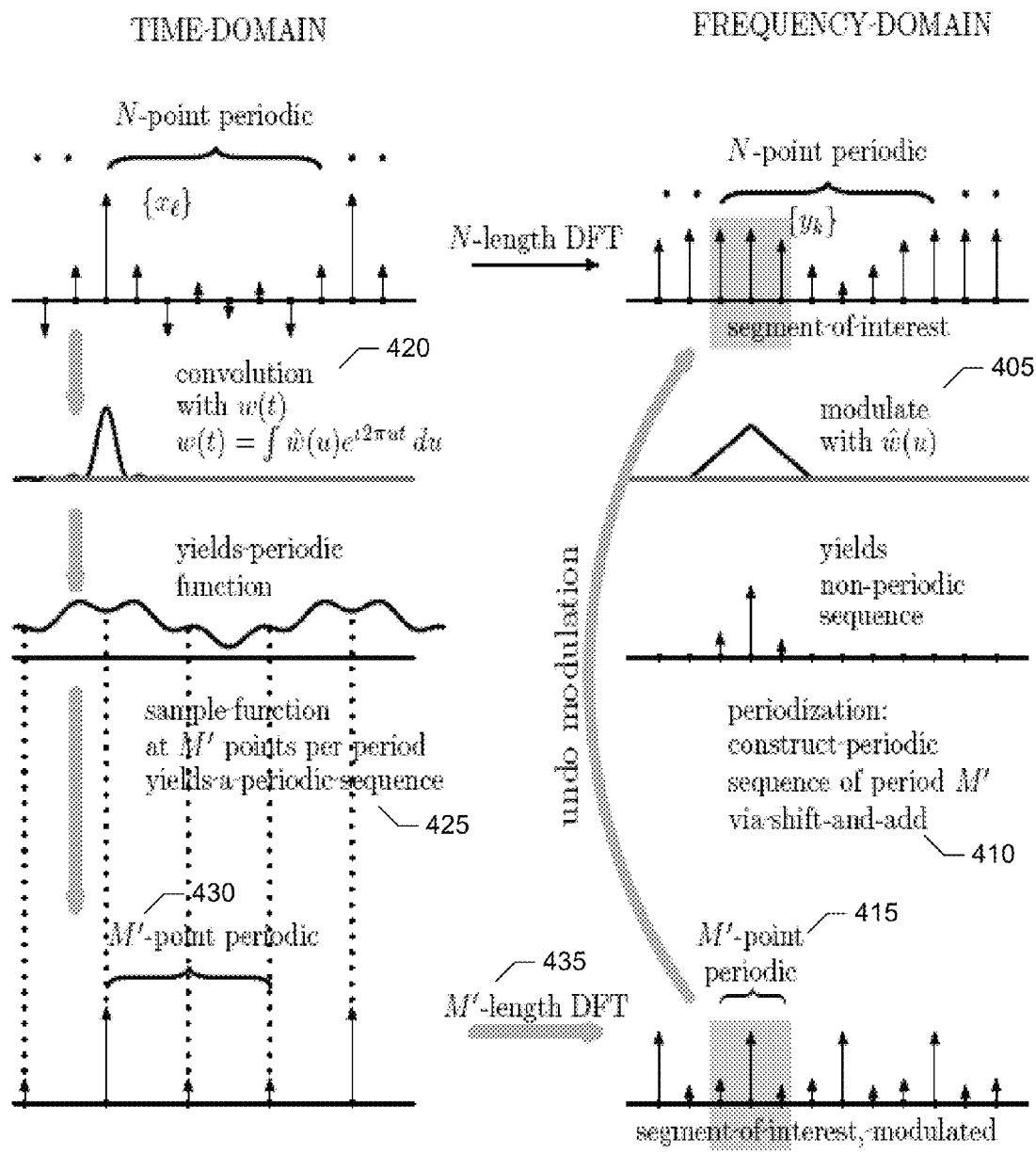
FIG. 4 is a diagram illustrating a principle of operation of the distributed FFT processor of FIG. 3.

Examining the processing performed by the distributed FFT processor 300 in further detail, consider an N-length DFT that transforms N time-domain (input) data points, $x_j$, $0 \leq j < N$, into N frequency-domain (output) data points $y_k$, $0 \leq k < N$. An example FFT decomposition implemented by the example distributed FFT processor 300 of FIG. 3 is based on a direct pursuit of a contiguous segment-of-interest of M'<N data points in the frequency domain, for example, $y_k$, $0 \leq k < M'$. An example technique to accomplish this pursuit involves constructing M' time-domain values from which the segment of interest can be determined. The basic approach is depicted in FIG. 4. Consider both $\{x_j\}$ and $\{y_k\}$ to be (infinite) periodic sequences, both of period N. If the sequence $\{y_k\}$ was available (which it is not, as it is the sequence to be computed), a period-M' periodic sequence in the frequency domain can be constructed by (1) modulation (pointwise multiplication) 405 with a bandpass filter to substantially eliminate the data not of interest, and (2) periodization (via shift-and-add) 410 of the outcome of the modulation, thus creating a period-M' periodic sequence 415 containing a modulated form of the segment of interest. However, as only $\{x_j\}$, and not $\{y_k\}$, is available, time domain processing that corresponds to the two previous frequency domain operation is performed. In particular, these time domain operations are (1) convolution 420 and (2) sampling 425. These time domain operations produce data points $\{\tilde{x}_l\}$ 430 from which the frequency segment of interest can be computed via a length-M' FFT 435, followed by demodulation.

In some examples, the distributed FFT processing performed by the distributed FFT processor 300 is based on each processor 110A-B computing, in parallel, a different segment-of-interest of the entire output FFT. Thus, the output segments-of-interest determined by each processor 110A-B are concatenated to form the output FFT sequence corresponding to the input data sequence. With the foregoing in mind, an example mathematical representation 500 of the distributed FFT processing performed by the distributed FFT processor 300, and which is based on the segment-of-interest approach discussed above, is illustrated in FIG. 5. The distributed FFT processing represented by the mathematical representation 500 is developed as follows. First, a disclosed example technique for computing an FFT segment of interest is presented. Second, further practical aspects of computing an FFT segment of interest are presented. Third, a novel framework for computing the FFT segments of interest and combining the individual segments into an overall FFT of an input data sequence is presented.

An example technique for computing an FFT segment of interest is developed as follows. The standard convolution theorem states that the Fourier transform of a convolution of two inputs is the pointwise product of the Fourier transforms of the inputs. In the context of continuous functions, the Fourier transform in the standard convolution theorem is the continuous Fourier transform and the convolution operation is linear convolution. In the context of finite vectors, the Fourier transform in the standard convolution theorem is the Discrete Fourier Transform (DFT) and the convolution operation is cyclic convolution. An example technique for computing an FFT segment of interest disclosed herein is based on a new variant of the convolutional theorem, referred to herein as the hybrid convolution theorem, that involves mixed operations of finite vectors with continuous functions.

The following definitions are useful in describing the hybrid convolution theorem. Let x and y be any N-length complex-valued vectors and M>0 be any positive integer. Then a window function is defined as follows. A function $w: R \to C$ (where R represents the domain of real numbers, and C represents the domain of complex numbers) is a window function if the function has continuous derivatives of all orders and decays to zero exponentially fast as $|t| \to \infty$. For example, $\hat{w}(u) = \int w(t) \exp(-2\pi u t) dt$, which is the continuous Fourier transform of w, is also a window function.

Using the preceding notation, hybrid convolution in the time domain is defined as follows. The sequence x convolved with an arbitrary window function w, represented mathematically as x*w, is defined to be the function:

$$(x * w)(t) = \sum_{\ell=-\infty}^{\infty} w\left(t - \frac{\ell}{N}\right) x_\ell, \quad \text{Equation 1}$$

for all $t \in R$ where $x_l = x_{l \bmod N}$ (by definition) whenever l is outside [0, N-1].

Using the preceding notation, hybrid sampling in the time domain is defined as follows. Let $f$ be any complex-valued function whose domain contains [0,1]. The hybrid sampling function, represented mathematically as Samp($f$;1/M), is defined to be an operator that produces the following length-M vector:

$$Samp(f;1/M) = \left[f(0), f\left(\frac{1}{M}\right), \ldots, f\left(1-\frac{1}{M}\right)\right]^T \quad \text{Equation 2}$$

Using the preceding notation, hybrid modulation in the frequency domain is defines as follows. The sequence y modulated by a continuous window function $\hat{w}$, represented mathematically as $y \cdot \hat{w}$, is defined to yield the following infinite sequence z:

$$y \cdot \hat{w} = z, \text{ where } z_k = y_k \cdot \hat{w}(k), k=0, \pm 1, \pm 2, \ldots \quad \text{Equation 3}$$

Using the preceding notation, periodization in the frequency domain is defined as follows. Given an absolutely summable infinite sequence $\{z_k\}$ (i.e., $\Sigma|z_k|<\infty$), the periodization operator, represented mathematically as Peri(z; M), produces the M-length vector z' given by:

$$Peri(z; M) = z', \quad \text{Equation 4}$$

where $$z'_k = \sum_{j=-\infty}^{\infty} z_{k+jM}$$

or k=0, 1, ..., M−1. Note that Equation 4 can be extended for all values of k, and the resulting infinite sequence of $z'_k$ would be periodic.

For the remainder of this disclosure, let $x = [x_0, x_1, \ldots, x_{N-1}]^T$ be a time-domain input vector of complex elements, and let $y = F_N x$ be the DFT of x, represented mathematically as:

$$y_k = \sum_{j=0}^{N-1} x_j \exp(-i2\pi jk/N), \quad \text{Equation 5}$$

$$k = 0, 1, \ldots, N-1$$

where $i = \sqrt{-1}$. The following hybrid convolution theorem provides a basis for computing y by computing a segment of interest. (The proof of the hybrid convolution theorem is provided below.) Let w be a continuous window function whose continuous Fourier transform is denoted by $\hat{w}$. (Thus, the window function can referred to using the variable w or the variable $\hat{w}$.) Then for any integer M>0, the hybrid convolution theorem provides that:

$$F_M \frac{1}{M} Samp(x*w; 1/M) = Peri(y \cdot \hat{w}; M). \quad \text{Equation 6}$$

In other words, the Fourier transform of the hybrid convolution of the sequence x with the continuous window function w is equal to the hybrid periodization of the Fourier transform of sequence x hybrid modulated by the Fourier transform of the continuous window function w.

The hybrid convolution theorem of Equation 6 can be used to determine a segment of interest of the Fourier transform y, such as the segment $y^{(0)} = [y_0, y_1, \ldots, y_{M-1}]^T$ for some integer M<N. Using the hybrid convolution theorem to determine the segment $y^{(0)}$ involves determining a window function $\hat{w}(u)$ and an integer M'≥M such that $y^{(0)}$ can be derived (exactly or accurately) from Peri(y·$\hat{w}$; M), which in turn can be computed as $F_M 1/M Samp(x*w; 1/M)$ from Equation 6.

For example, let $\hat{w}$ be a window function (e.g., in the frequency domain) such that $|\hat{w}(u)|>0$ on [0, M−1], and $|\hat{w}(u)|$ is small outside of (−δ−1, M') for some integer M'=M+δ≥M. Consider the length-M' vector $\tilde{y}$, given by:

$$\tilde{y} = Peri(y \cdot \hat{w}; M'). \quad \text{Equation 7}$$

In other words, the vector $\tilde{y}$ is length-M' periodization of the Fourier transform of the sequence x modulated by the window function $\hat{w}$. Then for k=0, 1, ..., M−1, Equation 7 can be written as:

$$\tilde{y}_k = y_k \hat{w}(k) + \sum_{|\ell|>0} y_{k+\ell M'} \hat{w}(k+\ell M') \approx y_k \hat{w}(k). \quad \text{Equation 8}$$

From Equation 7 and Equation 8, the segment $y^{(0)}$ can be approximated as $$y^{(0)} \approx \hat{W}^{-1} P_{roj}^{M',M} \tilde{y}, \quad \text{Equation 9}$$

where $\hat{W}$ is a diagonal matrix given by:

$$\hat{W} = \text{diag}(\hat{w}(0), \hat{w}(1), \ldots, \hat{w}(M-1)), \quad \text{Equation 10}$$

and $P_{roj}^{M',M}$ is a projection operator (e.g., implemented by the data discarder 315) that takes a length-M' vector and returns the top M elements. Using the hybrid convolution theorem of Equation 6, the vector $\tilde{y}$ is also given by:

$$\tilde{y} = Peri(\tilde{y} \cdot \hat{w}; M') = F_{M'} \tilde{x}, \quad \text{Equation 11}$$

where $$\tilde{x} = \frac{1}{M'} Samp(x*w; 1/M')$$

where $w = w(t) = \int \hat{w}(u) \exp(2\pi ut) du$, the inverse Fourier transform of the window function $\hat{w}$. In other words, the vector $\tilde{y}$, which is equal to the length-M' periodization of the Fourier transform of the sequence x modulated by the window function $\hat{w}$, is also equal to the length-M' Fourier transform of a sequence $\tilde{x}$ formed by sampling the hybrid convolution of the input sequence x and the time domain version of the window function, w. From the definition of hybrid convolution given by Equation 1, the process of determining $\tilde{x}$ in Equation 11 is linear in x and, thus, $\tilde{x}$ can be determined by a matrix multiplication of the form $\tilde{x} = C_0 x$ where $C_0$ is an M'-by-N matrix. Accordingly, from Equation 9, Equation 11 and the knowledge that $\tilde{x} = C_0 x$, the segment $y^{(0)}$ can be approximated as:

$$y^{(0)} \approx \hat{W}^{-1} P_{roj}^{M',M} F_{M'} C_0 x. \quad \text{Equation 12}$$

The expression in Equation 12 for calculating the Fourier transform segment $y^{(0)}$ corresponds to the processing illustrated in FIG. 4. For example, multiplication of the input sequence x by the matrix $C_0$ corresponds to the operations illustrated in FIG. 4 that are performed in the time domain, and the operation represented by $\hat{W}^{-1} P_{roj}^{M',M}$ correspond to demodulation only on M points in the frequence domain. However, Equation 12 may not be a practical computation tool for computing the Fourier transform segment $y^{(0)}$ due to the following issues. First, $y^{(O)}$ is not obtained exactly because $\tilde{y}_k$ is not exactly $y_k \cdot \hat{w}(k)$ for k in [0,M−1]. Instead, $\tilde{y}_k$ may be contaminated with values of y outside of [0, M−1]. (e.g., if $\hat{w}$ is not zero outside of (−δ−1, M')). This kind of contamination may be considered to be a type of aliasing as values from higher frequency domains (e.g., outside of [0, M−1]) are included in $\tilde{y}_k$. Second, the matrix $C_O$ may be dense, and the associated arithmetic cost in computing $y^{(O)}$ may be unacceptably high. By suitable choices of M' and $\hat{w}$, $C_O$ can be approximated by various sparse matrices and any approximation errors, including aliasing, can be made acceptably small. These and other practical aspects of computing an FFT segment of interest are now presented.

A computationally efficient variant of Equation 12 for calculating the Fourier transform segment $y^{(O)}$ can be developed as follows. The entries of the matrix $C_O$ are closely related to the values of the time-domain window function w(t). If w(t) decays to zero so rapidly that it is negligible except in a small region, it is likely that $C_O$ can be approximated well by a sparse matrix. In general then, w's counter part in the frequency domain, $\hat{w}(u)$, should be smooth and slow varying. On the other hand, $|\hat{w}(u)|$ should be small outside of (−δ−1, M') in order to attenuate the aliasing effect discussed. If we aim for both properties, but set M'=M, then $|\hat{w}(M-1)|$, which is within the segment of interest, would inevitably be small. This may be undesirable because, for example, the demodulation in Equation 12 (represented by the multiplication by the inverse matrix $\hat{W}^{-1}$) involves division by $|\hat{w}(k)|$, 0≤k≤M−1, and division by small numbers tends to magnify errors. Consequently, a practical implementation of Equation 12 sets M'>M, a process referred to herein as oversampling. The use of the term oversampling is appropriate because sampling in the time domain would be carried out at a rate 1/M', instead of 1/M, if the frequency band is limited to [0, M−1].

More specifically, let N=MP be the number of elements in the input data sequence and resulting output FFT sequence, and assume that an oversampling length of M'=M(1+β)=M+δ>M has been chosen. (A choice of β=¼ is typical, but any value could be used.) To construct the window function w, consider a reference window function $\hat{H}(u)$ having the following properties:

Property 1: $|\hat{H}(u)|>0$ on [−½,½];
Property 2:

$$\kappa = \max_{u,v \in [-1/2,1/2]} \left| \frac{\hat{H}(u)}{\hat{H}(v)} \right|,$$

which the condition number for the window function, is moderate (e.g., less than $10^3$); and
Property 3

$$\varepsilon^{(alias)} = \frac{\int_{|u| \geq 1/2+\beta} |\hat{H}(u)| du}{\int_{-1/2}^{1/2} |\hat{H}(u)| du},$$

which is the alias error for the window function, is small (e.g., corresponding to the floating-point rounding error in the distributed processing system 100).

An example of such a reference window function $\hat{H}(u)$ is the two-parameter, (τ, σ), reference window function given by the convolution (e.g., smoothing) of a rectangular function (e.g., a perfect bandpass filter) with a Gaussian function. This reference window function $\hat{H}(u)$ can be written mathematically as:

$$\hat{H}(u) = \frac{1}{\tau} \int_{-\tau/2}^{\tau/2} \exp(-\sigma(u-t)^2) dt. \qquad \text{Equation 13}$$

Next, let H(t) denote the inverse Fourier transform of $\hat{H}(u)$ or, in other words, the time-domain form of the reference window function. For a given threshold $\epsilon^{(trunc)}$ (for example, corresponding to the floating-point rounding error), an integer B is chosen such that $$\int_{|t| \geq B/2} |H(t)| dt \leq \epsilon^{(trunc)} \int_{-\infty}^{\infty} |H(t)| dt. \qquad \text{Equation 14}$$

In other words, the integer B is chosen such that the contribution of the time-domain form of the reference window function outside a domain containing B samples is within a specified truncation error. Then, given a reference window function $\hat{H}(u)$ and a chosen value for the integer B, the window function $\hat{w}$ described above for determining the segment the Fourier transform segment $y^{(O)}$ can be configured via translation, dilation, and phase shift operations as:

$$\hat{w}(u) = \exp(i\pi BP/N) \hat{H}((u-M/2)/M). \qquad \text{Equation 15}$$

Thus $|\hat{w}(u)|$ on [0, M]≈[0, M−1] corresponds to $|\hat{H}(u)|$ on [−½,½], and $|\hat{w}(u)|$ on (−∞,−δ−1]∪[M',∞) corresponds to $|\hat{H}(u)|$ on $|u| \geq ½+β$. Moreover, to within $1-\epsilon^{(trunc)}$ in relative accuracy, the following expression is valid:

$$\sum_{\ell=0}^{BP-1} \left| w\left(-\frac{\ell}{N}\right) \right| \approx \sum_{\ell=-\infty}^{\infty} \left| w\left(\frac{\ell}{N}\right) \right|. \qquad \text{Equation 16}$$

Turning to the matrix $C_O$, recall from Equation 11 and Equation 12 that $$C_O x = \frac{1}{M'} Samp(x^* w; 1/M').$$

Denote the entries of $C_O$ as $c_{jk}$, with indices starting at 0. From the definitions in Equation 1 through Equation 4 above, the elements of the matrix $C_O$ are given by:

$$c_{jk} = \frac{1}{M'} \sum_{\ell=-\infty}^{\infty} w\left(\left(\frac{j}{M'} - \frac{k}{N}\right) - \ell\right). \qquad \text{Equation 17}$$

If M' divides N or, in other words, if $$\frac{1}{M'} = \frac{L}{N}$$

for some integer L, Equation 17 shows that $c_{jk}=c_{j+1k'}$ where k'=(k+L)mod N. In other words, the matrix $C_O$ is completely specified by the matrix's first row, with each subsequent row corresponding to the previous row circular-shifted by L positions to the right. Furthermore, using Equation 16, the first row of the matrix $C_O$ can be approximated by $$\frac{1}{M'}\left[w(0), w\left(-\frac{1}{N}\right), \ldots, w\left(\frac{1-BP}{N}\right), \ldots\right] \approx$$

$$\frac{1}{M'}\left[w(0), w\left(-\frac{1}{N}\right), \ldots, w\left(\frac{1-BP}{N}\right), 0, 0, \ldots, 0\right].$$

Equation 18

If M' does not divide N, but $$\frac{1}{M'} = \frac{L}{N}\frac{v}{\mu}$$

where $v/\mu$ is a fraction in irreducible form, then a similar derivation from Equation 17 shows that $C_0$ is completely determined by its first $\mu$ rows. In particular, the (j+$\mu$)-th row of the matrix $C_0$ corresponds to the j-th row circular-right-shifted by vL positions.

Based on the forgoing properties of the matrix $C_0$ is row-j of $C_0$ can be approximated as:

$$\text{row-}j \text{ of } C_0 \approx [w_{j,0}^T, w_{j,1}^T, \ldots, w_{j,M}^T],$$

Equation 19 where each vector $w_{j,k}^T$ in row-j of $C_0$ is a length-P vector, and that all but a stretch of B of these $w_{j,k}^T$ vectors are zeros. Denoting the approximation matrix formed using the rows of Equation 19 as $C_0^{(trunc)}$, an example computation-efficient variant of Equation 12 for computing the Fourier transform segment $y^{(0)}$ is given by:

$$y^{(0)} \approx \hat{W}^{-1} P_{roj}^{M',M} F_{M'} C_0^{(trunc)} x.$$

Equation 20

The computation exhibited by the FFT factorization of Equation 20 involves a matrix-vector product and an M'-point FFT. Exploiting the sparsity of $C_0^{(trunc)}$, the operation cost for computing $y^{(0)}$ via Equation 20 is on the order of:

$$O(M' \log M') + O(N'B')$$

Equation 21 where N'=N(1+β). The nonzero block in the first row zero of $C_0^{(trunc)}$ is shifted right in a regular pattern as one traverses down the rows. Hence, $C_0^{(trunc)}x$ can be computed with one pass over the vector x.

The error introduced by the approximate nature of this factorization (e.g., the approximation of $C_0$ by $C_0^{(trunc)}$) is of the form:

$$\frac{\|\text{computed } y^{(0)} - y^{(0)}\|}{\|y\|} = O(\kappa(\varepsilon^{(fft)} + \varepsilon^{(alias)} + \varepsilon^{(trunc)})).$$

This characterization explains the effects of aliasing, truncation, and the computational error $\epsilon^{(fft)}$ on the underlying FFT algorithm. The κ term plays the role of a condition number. Finally, the κ and ε terms also underline a potential benefit for oversampling.

Building upon the previous discussions concerning computation of the Fourier transform segment $y^{(0)}$, an example distributed FFT framework for computing the overall Fourier transform y of an input data sequence x is presented. The disclosed example framework provides a family of single-all-to-all, in-order, O(N log N) DFT factorizations. The preceding discussions focused on computing a first segment of y, denoted as $y^{(0)} = [y_0, y_1, \ldots, y_{M-1}]^T$. The distributed FFT framework disclosed herein obtains the overall transform y by efficiently gathering $y^{(0)}$ and the other segments of y, where each segment is computed in the same manner.

To develop the distributed FFT framework, let N=MP be the number of input data elements and the number of output Fourier transform elements, and further denote the s-th segment of the overall Fourier transform y as:

$$y^{(s)} = [y_{sM}, y_{sM+1}, \ldots, y_{(s+1)M-1}]^T$$

Equation 22

Thus, the segments of the overall Fourier transform y are $y^{(s)}$ for s=0, 1, ..., P–1. The DFT ($F_N$) of a phase-shifted input x results in a translated DFT y. In other words, the first segment of $F_N(\Phi_s x)$ is the s-th segment, $y^{(s)}$, of the DFT y if:

$$\Phi_s = \text{diag}(1, \omega^s, \omega^{2s}, \ldots, \omega^{(N-1)s}),$$

Equation 23 where $$\omega = e^{-i\frac{2\pi M}{N}} = e^{-i\frac{2\pi}{P}}.$$

It follows, therefore, that the expression of Equation 20 for computing the first segment $y^{(0)}$ will also yield the s-th segment $y^{(s)}$ when applied to the phase-shifted input vector $\Phi_s x$. Also, it is to be noted that $\omega^P=1$ and the diagonal entries in $\Phi_s$ repeat themselves after P elements. In other words, $\Phi_s$ is a block diagonal matrix with M diagonal blocks, each being the diagonal matrix ($\omega_s$) where $\omega_s=[1, \omega^s, \omega^{2s}, \ldots, \omega^{(P-1)s}]$. Thus, in the succinct Kronecker product notation, $\Phi_s = I_M \otimes (\omega_s)$, where $I_M$ is the dimension-M identity matrix. (The Kronecker product of matrices A and B is defined to be the matrix $A \otimes B = \lfloor a_{k,l} B \rfloor$ where $A=[a_{k,l}]$. The Kronecker product notation is a useful notation for representing operations that can be implemented in parallel. For example, $I_p \otimes M_{l \times m}$ for an l×m matrix M translates to an implementation involving p-parallel matrix operations each involving a local m-vector.)

From the foregoing, the s-th segment $y^{(s)}$ of the Fourier transform y is given by:

$$y^{(s)} \approx \hat{W}^{-1} P_{roj}^{M',M} F_{M'} C_0^{(trunc)} [I_M \otimes \text{diag}(\omega_s)]x = \hat{W}^{-1} P_{roj}^{M',M} F_{M'} C_s^{(trunc)} x$$

Equation 24

In Equation 24, $C_s^{(trunc)}$ denotes $C_0^{(trunc)}[I_M \otimes (\omega_s)]$, which is an M'-by-N matrix. Stacking all the segments $y^{(s)}$, s=0, 1, ..., P–1, together yields the output Fourier transform y, which can be represented as $$y \approx I_P \otimes (\hat{W}^{-1} P_{roj}^{M',M} F_{M'}) C^{(trunc)} x.$$

Equation 25

In Equation 25, the matrix $C^{(trunc)}$ is given by:

$$C^{(trunc)} = \begin{bmatrix} C_0^{(trunc)} \\ C_1^{(trunc)} \\ \vdots \\ C_{P-1}^{(trunc)} \end{bmatrix}.$$

Equation 26

However, applying the $C^{(trunc)}$ matrix of Equation 26 row-by-row as-is, may have high communication cost, as each $C_s^{(trunc)}$ block processes the entire input x. Applying the $C^{(trunc)}$ matrix of Equation 26 row-by-row as-is may also have high arithmetic cost, as the total operation count is O(PB), which increases linearly with P. To reduce the costs, the $C^{(trunc)}$ matric can rearranged as follows.

Let $P_{erm}^{l,n}$, where l divides n, denote the stride-l permutation operation given by:

$$w = P_{erm}^{l,n} v \Leftrightarrow v_{j+kl} = w_{k+j(n/l)}, \text{ for all } 0 \le j < l \text{ and } 0 \le k < n/l.$$

Equation 27

In other words, the operation $P_{erm}^{l,n}$ permutates the elements of a vector such that each element of vector is taken in turn and cyclically placed as the next n/l-th element in the vector. (As used herein, the terms "permutate" and "permute" both refer to the operations performed by $P_{erm}^{l,n}$ and similar permutation operations.) Next, consider that the permutation operations $P_{erm}^{P,N'}$ and $P_{erm}^{M',N'}$ are inverses of each other. Accordingly, the matrix $C^{(trunc)}$ matric can rewritten as:

$$C^{(trunc)} = P_{erm}^{P,N'} P_{erm}^{M',N'} C^{(trunc)} = P_{erm}^{P,N'} A \qquad \text{Equation 28}$$

In Equation 28, the matrix A is given by:

$$A = P_{erm}^{M',N'} \begin{bmatrix} C_0^{(trunc)} \\ C_1^{(trunc)} \\ \vdots \\ C_{P-1}^{(trunc)} \end{bmatrix} = \begin{bmatrix} A_0 \\ A_1 \\ \vdots \\ A_{M'-1} \end{bmatrix} \qquad \text{Equation 29}$$

The j-th block, $A_j$, of the A matrix is a P-by-N matrix consisting of gathering all of the j-th rows of the $C_s^{(trunc)}$ matrices. However, from Equation 19 and Equation 24, row-j of matrix $C_s^{(trunc)}$ is given by:

$$\text{row-} j \text{ of } C_s^{(trunc)} = [w_{j,0}^T, w_{j,1}^T, \ldots, w_{j,M}^T][I_M \otimes \text{diag}(\omega_s)] \qquad \text{Equation 30}$$

$$= \omega_s[\text{diag}(w_{j,0}^T)\text{diag}(w_{j,1}^T) \ldots \text{diag}(w_{j,M}^T)].$$

Figure 9:
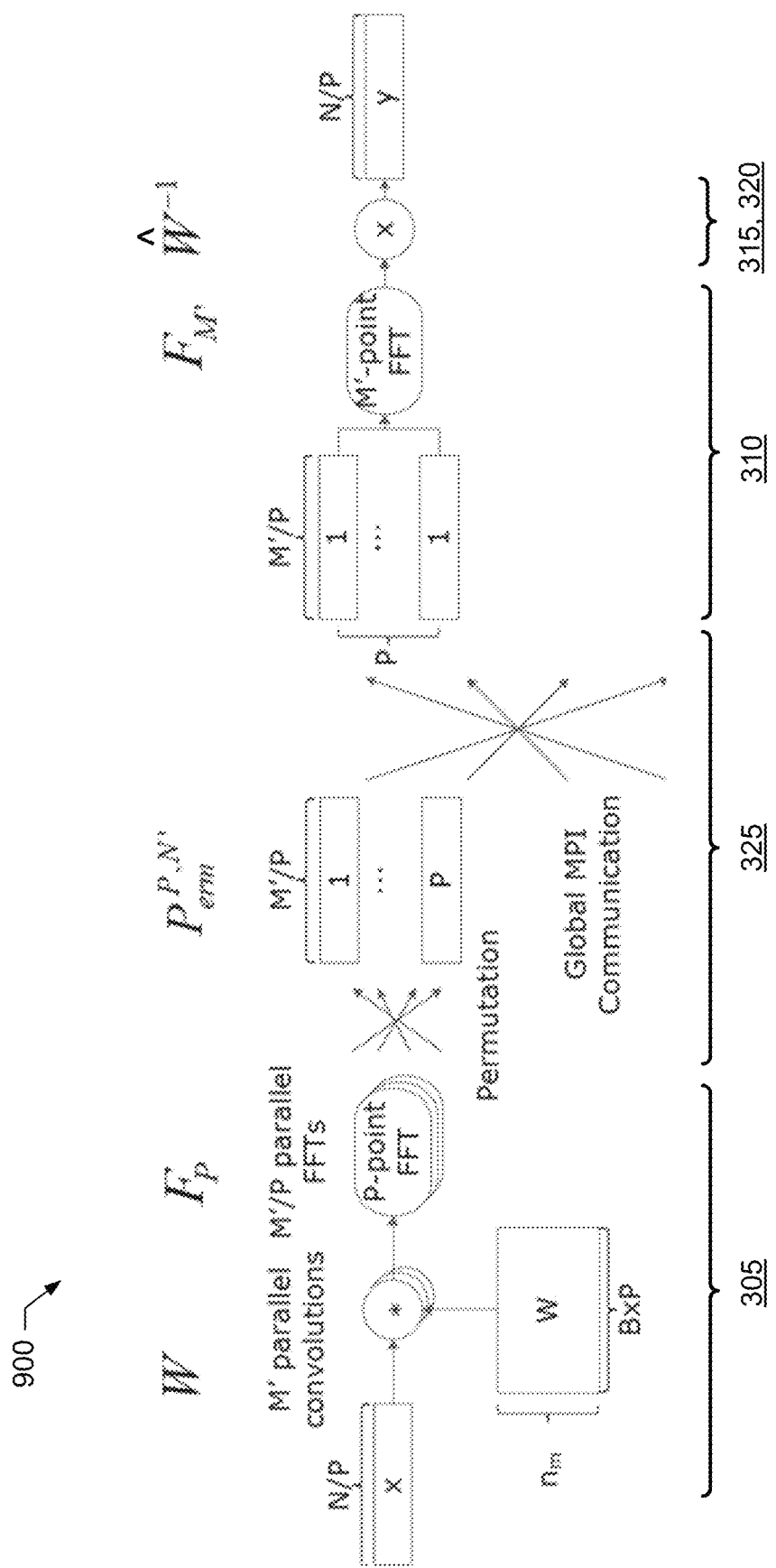
FIG. 9 is a block diagram illustrating an example implementation of the distributed FFT processor of FIG. 3 based on the mathematical representation of FIG. 5 and the procedures of FIGS. 6-8.

Stacking the j-th row of each $C_s^{(trunc)}$ matrix, for s=0, 1, ..., P−1, and noting that the diagonal matrix ($\omega_s$) is the s-th row of the DFT matrix $F_P$, yields the matrix $A_j$ of Equation 29, which is given by:

$$A_j = F_P[\text{diag}(w_{j,0}^T)\text{diag}(w_{j,1}^T) \ldots \text{diag}(w_{j,M}^T)] = F_P W_j, \qquad \text{Equation 31}$$

where $W_j = [\text{diag}(w_{j,0}^T)\text{diag}(w_{j,1}^T) \ldots \text{diag}(w_{j,M}^T)]$. Combining the $A_j$ matrices of Equation 31, for s=0, 1, ..., M'−1, yields the A matrix, which is given by:

$$A = (I_{M'} \otimes F_P) W \qquad \text{Equation 32}$$

where W is a matrix formed by stacking the $W_j$ matrices of Equation 31, for j=0 up to M'−1. The matrices $W_j$ are sparse as they are block diagonal matrices each with only B nonzero blocks and containing elements determined from the window function $\hat{w}$, as described above. Similar to the matrix $C_0$, the blocks of contiguous nonzeros elements of the matrix W are shifted right in a regular pattern as one traverses down blocks of rows. This property is illustrated in FIG. 9, which is described in greater detail below.

Combining Equation 25, Equation 28 and Equation 32 yields an example mathematical representation of the distributed FFT processing performed by the distributed FFT processor 300 given by Equation 33:

$$y \approx I_P \otimes (\hat{W}^{-1} P_{roj}^{M',M} F_{M'}) P_{erm}^{P,N'} (I_{M'} \otimes F_P) Wx. \qquad \text{Equation 33}$$

Referring to Equation 33 and the distributed FFT processor 300 of FIG. 3, in some examples, the window convolver 305 implements the window convolution (corresponding to Wx) and the first FFT processing (corresponding to $(I_{M'} \otimes F_P)$) of Equation 33. In such examples, the data permutator 325 implements the data permutation operation (corresponding to $P_{erm}^{P,N'}$) of Equation 33. Additionally, in such examples, the FFT processor 310 implements the second FFT processing (corresponding to $I_P \otimes F_{M'}$) and the data discarder 315 implements the data discarding operation (also referred to as data projection and corresponding to $I_P \otimes P_{roj}^{M',M}$) of Equation 33. Furthermore, in such examples, the demodulator 320 implements the data demodulation operation (corresponding to $I_P \otimes \hat{W}^{-1}$) of Equation 33.

The distributed FFT processing represented by Equation 33 specifies a family of DFT factorizations characterized by the window function (e.g., w, $\hat{w}$), the oversampling rate (e.g., M'/M=N'/N), and the accuracy characteristics (e.g., $\epsilon^{(alias)}$ and $\epsilon^{(trunc)}$) specified for a particular implementation. Furthermore, the DFT factorization represented by Equation 33 includes only one all-to-all data exchange (e.g., one global transpose), which corresponds to $P_{erm}^{P,N'}$. The arithmetic operation count for the DFT factorization represented by Equation 33 is $O(N' \log M')+O(N' \log P)+O(N'B)$, which can be rewritten as:

$$\text{Arithmetic Cost} = O(N' \log N')+O(N'B). \qquad \text{Equation 34}$$

Compared to prior DFT factorizations, the example DFT factorization of Equation 33 involves only one global all-to-all communication between N' data points, as compared to three such operations, each involving N data points, which are performed by the prior DFT factorization. However, the example DFT factorization of Equation 33 may involve a higher arithmetic cost, such as by a factor of 1+β over prior factorization, plus another additional O(B) cost. The following disclosure demonstrates that this tradeoff (e.g., reducing the number of global all-to-all data exchanges but increasing arithmetic cost) can be beneficial in high-performance large-data computations.

Figure 5:
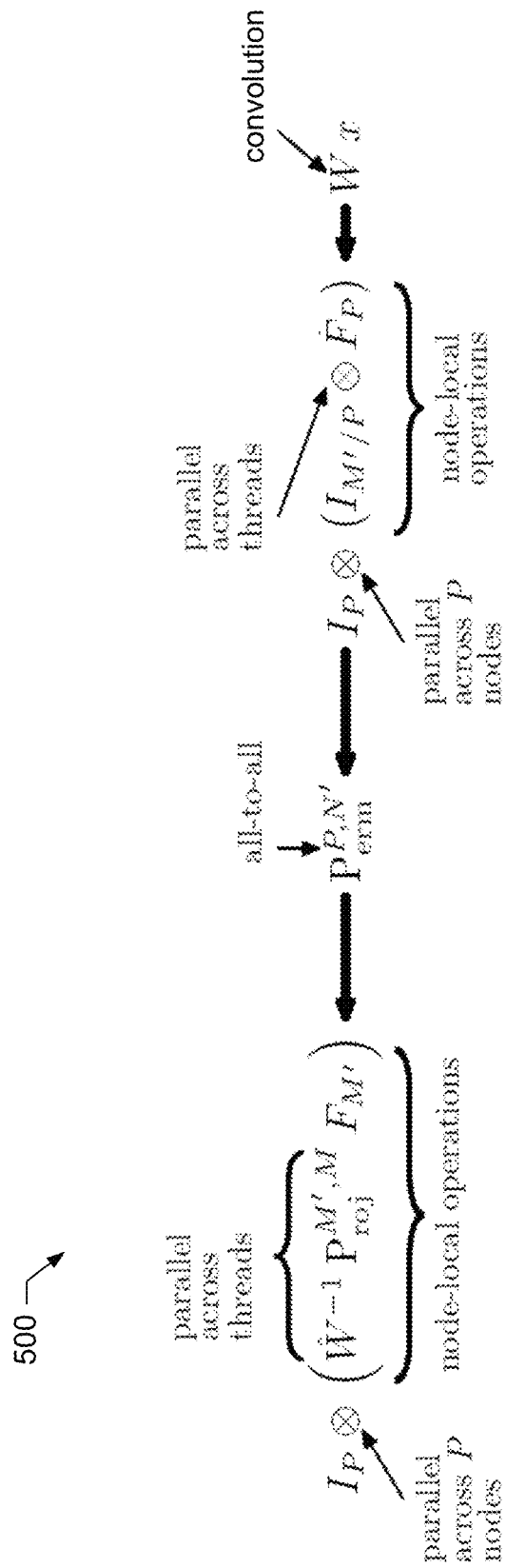
FIG. 5 illustrates an example mathematical representation for the processing performed by the distributed FFT processor of FIG. 3.

The mathematical expression 500 of FIG. 5 corresponds to an example implementation of the DFT factorization of Equation 33 that is further tailored for parallel implementation by, for example, the distributed processing system 100. To develop the mathematical expression 500 of FIG. 5, consider that the Kronecker product of the form $I_l \otimes A$ expresses parallelism in that the Kronecker product can also be interpreted as l copies of the matrix A being applied independently on l contiguous segments of stride-one data. Furthermore, because $I_{lm} \otimes A = I_l \otimes (I_m \otimes A)$, multiple levels of parallelism can be realized readily. FIG. 5 corresponds to an example implementation based on the realization that the first processing represented in Equation 33 and corresponding to $(I_{M'} \otimes F_P)Wx$ can be rewritten as:

$$(I_{M'} \otimes F_P)Wx = I_P \otimes (I_{M'/P} \otimes F_P) Wx. \qquad \text{Equation 35}$$

Combining Equation 35 with Equation 33 yields the mathematical expression 500 of FIG. 5, which is repeated in Equation 36:

$$y \approx I_P \otimes (\hat{W}^{-1} P_{roj}^{M',M} F_{M'}) P_{erm}^{P,N'} [I_P \otimes (I_{M'/P} \otimes F_P)] Wx. \qquad \text{Equation 36}$$

Equation 36 and the mathematical expression 500 of FIG. 5 correspond to an example implementation of the distributed FFT processor 300 in which the number of FFT segments, P, equals the number of processor nodes 110A-B. In such an example implementation, each of the processor nodes 110A-B implements a respective instance of the first FFT processing performed by the window convolver 305 (corresponding to $I_P \otimes (I_{M'/P} \otimes F_P)$ in the mathematical expression 500 of FIG. 5 and Equation 36), and each of the processor nodes 110A-B also implements a respective instance of the second processing performed by the FFT processor 310, the data discarder 315 and the data demodulator 320 (corresponding to $I_P \otimes (\hat{W}^{-1} P_{roj}^{M',M} F_{M'})$ in the mathematical expression 500 of FIG. 5 and Equation 36). More generally, P can be a multiple of number of processor nodes, thereby increasing the granularity of parallelism. Furthermore, some example implementations of the distributed FFT processor 300, which utilize the mathematical expression 500 of FIG. 5 and Equation 36, can employ a hybrid parallel programming model consisting of message passing interface (MPI) processes and open multiprocessing (OpenMP) threads, configured appropriately to exploit the specific hardware resources of nodes, sockets, cores, and (hardware) threads.

Figure 6:
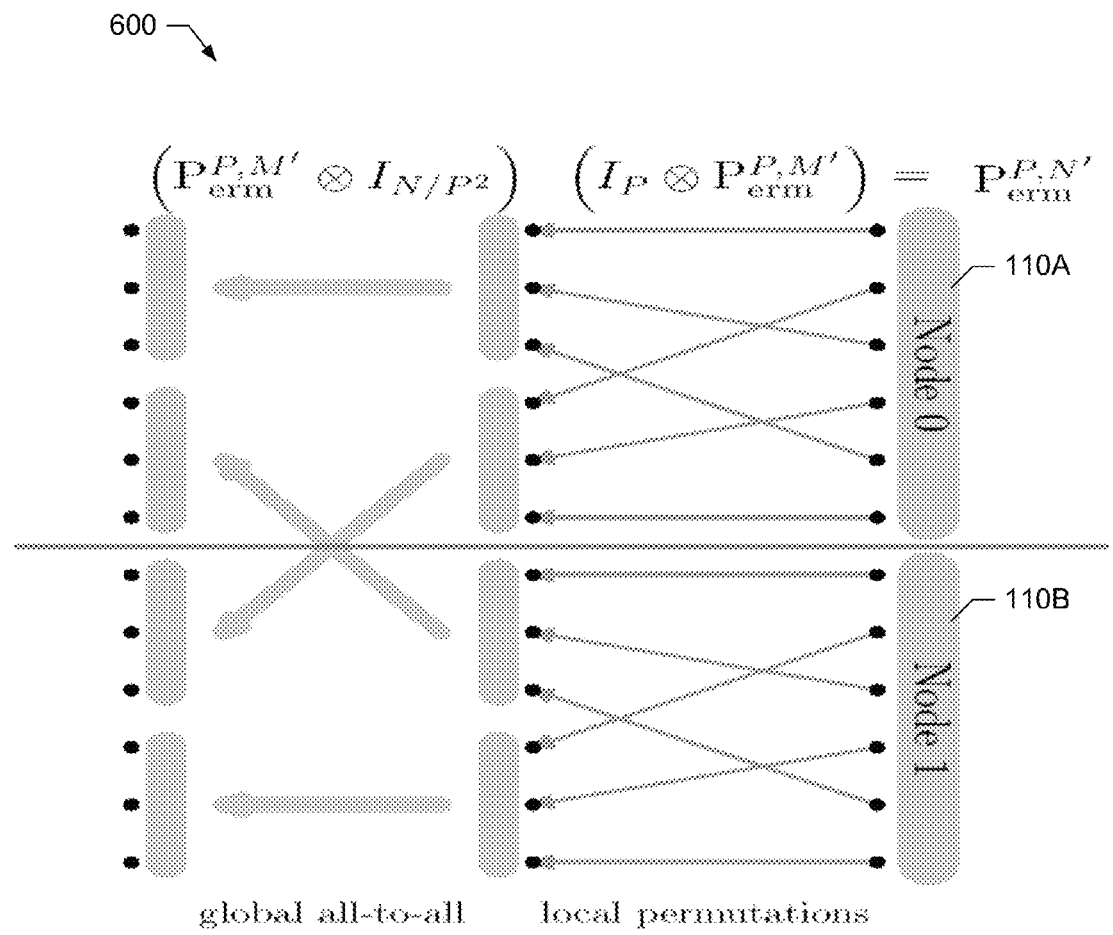
FIG. 6 illustrates an example permutation operation that can be used to implement the distributed FFT processor of FIG. 3.

FIG. 6 illustrates an example implementation 600 of the all-to-all data permutation operation $P_{erm}^{P,N'}$ of Equation 36, which is tailored for parallel implementation by, for example, the distributed processing system 100. Permutation can be implemented as a parallel operation because each source data can be sent to its distinct destination independently. The Kronecker product notation can be used to describe $P_{erm}^{P,N'}$ in a way that maps to a parallel implementation. For example, the implementation 600 of FIG. 6 is based on a mapping of $P_{erm}^{P,N'}$ given by:

$$P_{erm}^{P,N'} = (P_{erm}^{P,M'} \otimes I_{N/P^2})(I_P \otimes P_{erm}^{P,M'}). \quad \text{Equation 37}$$

The example implementation 600 of FIG. 6, which is based on Equation 37, corresponds to an example in which the number of processors is P=2, and the oversampled data length is N'=12. In the illustrated example, to implement the all-to-all data permutation operation $P_{erm}^{P,N'}$, each processor node 110A-B performs node-local permutations (corresponding to the operation $I_P \otimes P_{erm}^{P,M'}$ in Equation 37) to gather data destined for the same foreign processor node into contiguous memory locations, thereby decreasing the number of messages involved in the remaining all-to-all data exchange (corresponding to the operation $P_{erm}^{P,M'} \otimes I_{N/P^2}$ in Equation 37).

Figures 7, 8:
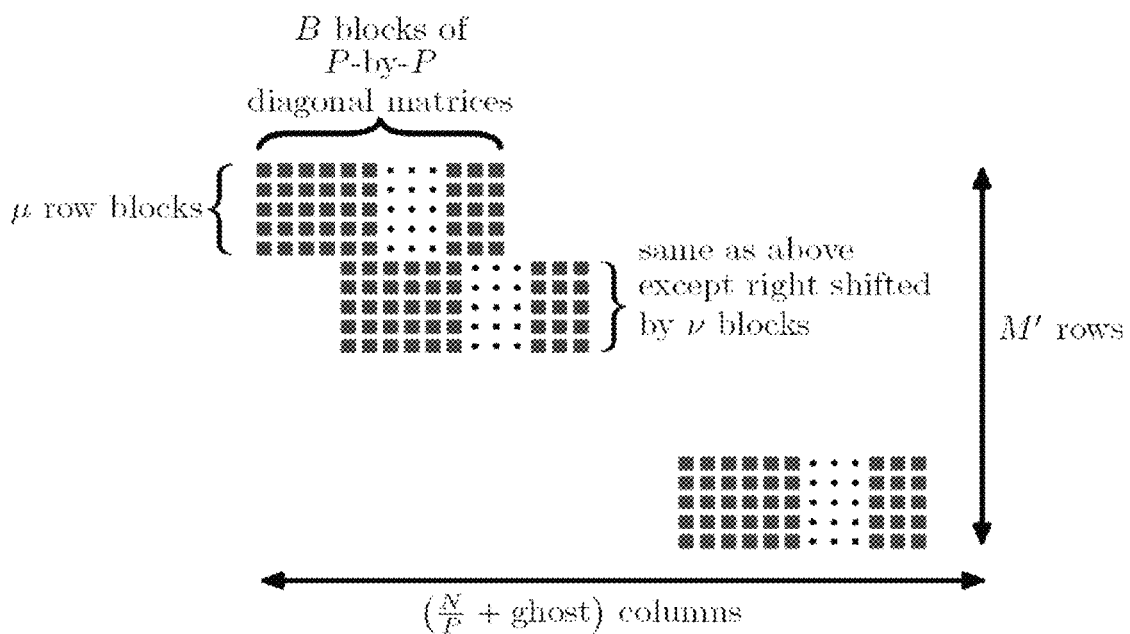
FIGS. 7-8 illustrate an example window convolution procedure that can be used to implement the distributed FFT processor of FIG. 3.

FIGS. 7-8 collectively illustrate example pseudo code 700 and an example local convolution matrix 800 corresponding to an example implementation of the window convolution operation Wx of Equation 36, which is tailored for parallel implementation by, for example, the distributed processing system 100. Referring to Equation 36 and the mathematical expression 500 of FIG. 5, the computational tasks include the FFTs (corresponding to the groups of $F_P$ and $F_{M'}$) and the window convolution (corresponding to the matrix-vector product Wx). The arithmetic costs of the FFT tasks are comparable to those of a standard FFT $F_N$x. The arithmetic costs incurred by the window convolution Wx can be viewed as an extra cost incurred to achieve the reduced all-to-all communication cost of the distributed FFT processing disclosed herein. The example implementation of the window convolution Wx illustrated in FIGS. 7-8 endeavors to reduce the arithmetic cost associated with this operation.

In the illustrated example of FIGS. 7-8, the window convolution operation, W times x, is carried out by each processing node 110A-B computing, in parallel, a local matrix-vector product. The local matrix 800 is highly structured, as illustrated in the example of FIG. 8. The dimension of the local matrix 800 is M'-by-(M+(B−ν)P). The parameters μ and ν are related to the oversampling factor as μ/ν=N'/N=M'/M=1+β. For example β=¼ yields μ=5 and ν=4. The input data to be multiplied by the local matrix 800 data is the M=N/P input segment provided to the particular node 100A-B, and (B−ν)P elements from the input segment provided to adjacent processing node 100A-B. This amount is typically less than 0.01% of M. The local matrix 800 is structured as shown in FIG. 8. Each P-by-P block of the local matrix 800 is a diagonal matrix. The entire matrix has μPB distinct elements, which can facilitate locality optimization strategies.

The computation loop on a processing node 100A-B is represented by the pseudo code 700 of FIG. 7, and includes M'/(μP) chunks of operations, each of which involves μP independent, length-B inner products. The pseudo code 700 of FIG. 7 can be further optimized as follows. To keep partial sums of inner products in registers while exploiting single instruction, multiple data (SIMD) parallelism, loop_d can be unrolled by the width of the native SIMD instructions and the order of loop_c and loop_d can be interchanged. For the locality of accessing matrix elements and the input data (both in cache and register levels), loop_a can be unrolled twice and loop_b can be unrolled μ times, with the result being jammed into loop_d. The convolution computation can be fused with the succeeding loops for FFT and local permutation. A small array can be reused across iterations for passing data between the convolution, FFT, and local permutation operations.

FIG. 9 illustrates an example parallel processing implementation 900 of the distributed FFT processing corresponding to the mathematical expression 500 and Equation 36, further refined by the example implementation 600 of the all-to-all data permutation operation $P_{erm}^{P,N'}$, and the example implementation of the window convolution Wx illustrated in FIGS. 7-8. The example implementation 900 of FIG. 9 depicts the processing performed by each respective processing node 110A-B in a distributed processing system, such as the distributed processing system 100. In the example implementation 900 of FIG. 9, and referring to the mathematical expression 500 of FIG. 5 and Equation 36), each processor 110A-B implements a respective instance of the window convolver 305 according to the examples of FIGS. 7-8 to implement the M' convolutions (corresponding to the processor's portion of Wx), and M'/P, P-point FFTs, $F_P$. Each processor 110A-B also implements a respective portion of the data permutator 325 that performs a local portion of the data permutation operation $P_{erm}^{P,N'}$. The remainder of the data permutator 325 is implemented by the processors 110A-B collectively and the communication interface 115, which collectively perform the global portion of the data permutation operation $P_{erm}^{P,N'}$. Each processor 110A-B further implements respective instances of the FFT processor 310, the data discarder 315 and the data demodulator 320 to implement the M'-point FFTs, $F_{M'}$, the data discarding/projection operation $P_{roj}^{M',M}$, and the data demodulation operation $\hat{W}^{-1}$.

While example manners of implementing the distributed FFT processor 300 have been illustrated in FIGS. 1, 3-9, one or more of the elements, processes and/or devices illustrated in FIGS. 1, 3-9 may be combined, divided, re-arranged, omitted, eliminated and/or implemented in any other way. Further, the example input interface 105, the example processor nodes 110A-B, the example communication interface 115, the example output interface 120, the example window convolver 305, the example FFT processor 310, the example data discarder 315, the example data demodulator 320, the example data permutator 325 and/or, more generally, the example distributed FFT processor 300 of FIGS. 1, 3-9 may be implemented by hardware, software, firmware and/or any combination of hardware, software and/or firmware. Thus, for example, any of the example input interface 105, the example processor nodes 110A-B, the example communication interface 115, the example output interface 120, the example window convolver 305, the example FFT processor 310, the example data discarder 315, the example data demodulator 320, the example data permutator 325 and/or, more generally, the example distributed FFT processor 300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example distributed FFT processor 300, the example input interface 105, the example processor nodes 110A-B, the example communication interface 115, the example output interface 120, the example window convolver 305, the example FFT processor 310, the example data discarder 315, the example data demodulator 320 and/or the example data permutator 325 are hereby expressly defined to include a tangible computer readable medium such as a memory, digital versatile disk (DVD), compact disk (CD), Blu-ray Disc™, etc., storing such software and/or firmware. Further still, the example distributed FFT processor 300 of FIGS. 1, 3-9 may include one or more elements, processes and/or devices in addition to, or instead of, those illustrated in FIGS. 1, 3-9, and/or may include more than one of any or all of the illustrated elements, processes and devices.

Figure 10:
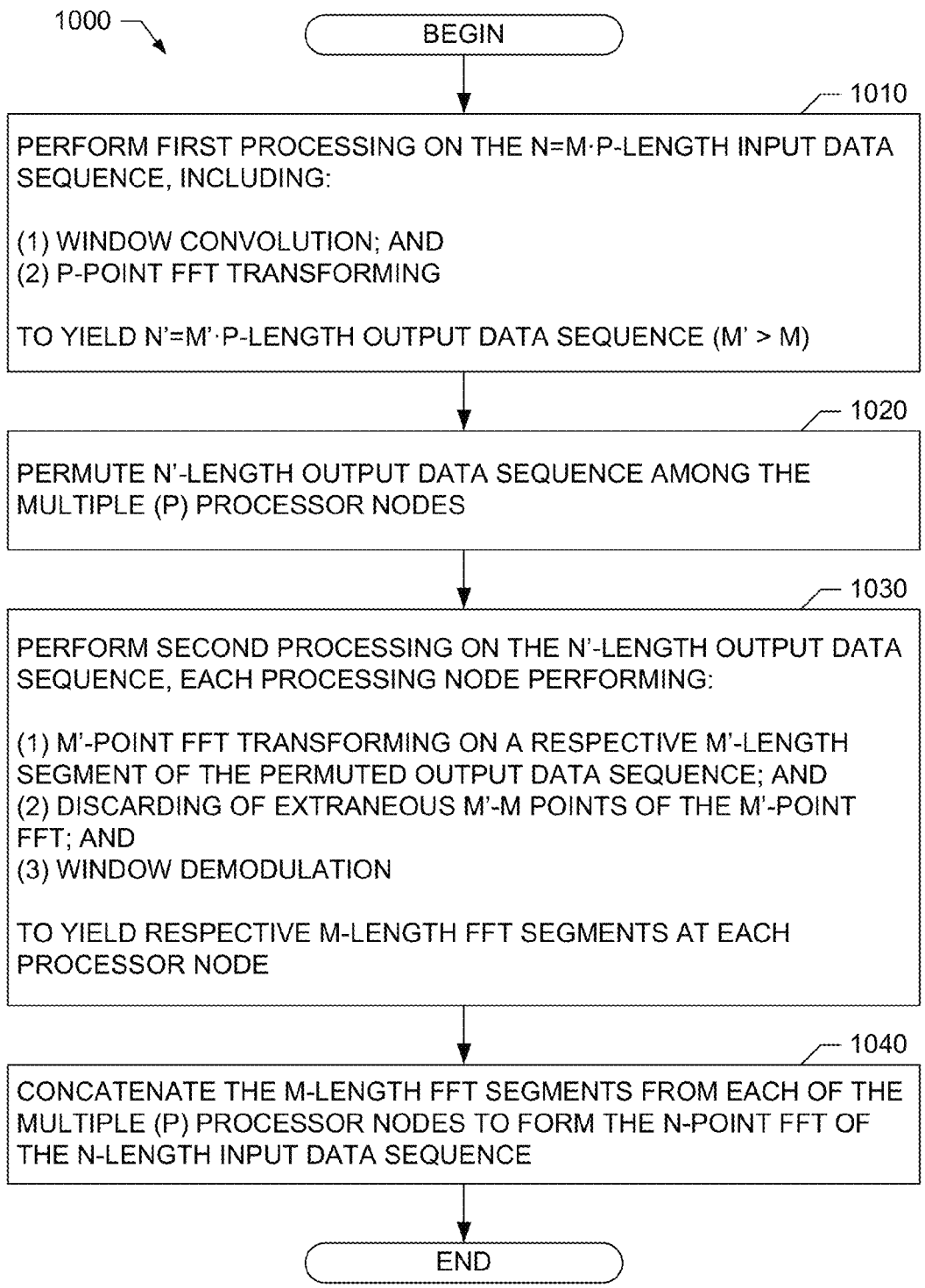
FIG. 10 is a flowchart representative of example machine readable instructions that may be executed to implement the example distributed FFT processor of FIG. 3.

A flowchart representative of example machine readable instructions for implementing the example distributed FFT processor 300, the example input interface 105, the example processor nodes 110A-B, the example communication interface 115, the example output interface 120, the example window convolver 305, the example FFT processor 310, the example data discarder 315, the example data demodulator 320 and/or the example data permutator 325 is shown in FIG. 10. In this example, the machine readable instructions represented by the flowchart may comprise one or more programs for execution by a processor, such as the processor 1612 shown in the example processing system 1600 discussed below in connection with FIG. 16. The one or more programs, or portion(s) thereof, may be embodied in software stored on a tangible computer readable storage medium such as a CD-ROM, a floppy disk, a hard drive, a digital versatile disk (DVD), a Blu-ray Disc™, or a memory associated with the processor 1612, but the entire program or programs and/or portions thereof could alternatively be executed by a device other than the processor 1612 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIG. 10 may be implemented manually. Further, although the example machine readable instructions are described with reference to the flowchart illustrated in FIG. 10, many other methods of implementing the example distributed FFT processor 300, the example input interface 105, the example processor nodes 110A-B, the example communication interface 115, the example output interface 120, the example window convolver 305, the example FFT processor 310, the example data discarder 315, the example data demodulator 320 and/or the example data permutator 325 may alternatively be used. For example, with reference to the flowchart illustrated in FIG. 10, the order of execution of the blocks may be changed, and/or some of the blocks described may be changed, eliminated, combined and/or subdivided into multiple blocks.

As mentioned above, the example process of FIG. 10 may be implemented using coded instructions (e.g., computer readable instructions) stored on a tangible computer readable storage medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage and to exclude propagating signals. Additionally or alternatively, the example process of FIG. 10 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage device and/or storage disk and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Example machine readable instructions 1000 that may be executed to implement the example distributed FFT processor 300 of FIGS. 1, 3-9 are represented by the flowchart shown in FIG. 10. With reference to the preceding figures and associated written descriptions, execution of the machine readable instructions 1000 begins at block 1010 at which the window convolver 305 of the distributed FFT processor 300 performs first processing on an input data sequence, x, having N=MP elements. As described above, the window convolver 305 is implemented using multiple processors 110A-B, and the first processing performed by the window convolver 305 includes convolving the input sequence x with a window function w (corresponding to Wx in Equation 36 and FIG. 5) and performing P-point FFT transforms on respective segments of the convolution of the input sequence x with the window function w (corresponding to the FFT operations $F_P$ in Equation 36 and FIG. 5). As noted above, the output data sequence of the first processing performed at block 1010 exhibits oversampling such that the length of the output sequence, N', is larger than the length, N, of the input sequence (e.g., where N'/N=M'/M=$\mu/\nu$=1+$\beta$). As further noted above, in some examples, each processor node of the multiple processing nodes 110A-B implementing the distributed FFT processor 300 can perform respective instances of the first processing at block 1010 on respective segments of the input sequence, x. In such examples, the output data segment resulting from the first processing performed at each processing node 110A-B has a length, M', that is larger than the length, M, of the input sequence.

At block 1020, the data permutator 325 of the distributed FFT processor 300 permutates the length-N' output data from the first processing of block 1010 among the multiple processors 110A-B implementing the distributed FFT processor 300. As described above, the permutation processing at block 1020 corresponds to the $P_{erm}^{P,N'}$ operation in Equation 36 and FIG. 5).

At block 1030, the distributed FFT processor 300 performs second processing, using the multiple processors 110A-B, on the output data sequence from the first processing performed at block 1010 and permutated at block 1020. As described above, at block 1020, each processing node of the multiple processing nodes 110A-B performs a respective instance of the second processing on a respective permutated portion of the output data obtained from the processing at blocks 1010 and 1020 to determine a respective, ordered segment, $y^{(s)}$, of the Fourier transform of the input data sequence, x. For example, each processor 110A-B may implement respective instances of the FFT processor 310, the data discarder 315 and the data demodulator 320 of the distributed FFT processor 300 to perform (1) an M'-point FFT on a respective M'-length portion of the permuted output data sequence from the first processing; (2) data discarding/projection to discard M'−M data elements from the output of the M'-point FFT; and (3) window demodulation corresponding to multiplying the resulting M-point FFT (after data discarding) by the matrix $\hat{W}^{-1}$, which yields the respective FFT segment, $y^{(s)}$, as described above.

At block 1040, the distributed FFT processor 300 concatenates the respective FFT segments, $y^{(s)}$, determined by each processing node 110A-B at block 1030 to form the overall FFT sequence, y, of the input data sequence, x. For example, such concatenation can be represented mathematically as $y=[(y^{(0)})^T(y^{(1)})^T \ldots (y^{(P-1)})^T]^T$.

FIGS. 11-15 depict example performance results for the distributed FFT processing disclosed herein, which may be implemented by the distributed FFT processor 300 and is referred to as the SOI FFT procedure in the following description and in FIGS. 11-15. The performance of the disclosed SOI FFT procedure is presented relative to several prior FFT algorithms, such as (1) the Intel® Math Kernel Library (MKL) FFT procedure, (2) the FFTW procedure described in Frigo et al, "The Design and Implementation of FFTW," Proceedings of the IEEE, Vol. 93, pp. 216-231, 2005, and (3) the FFTE procedure described in D. Takahashi, "A Parallel 1-D FFT Algorithm for the Hitachi SR8000," Parallel Computing, Vol. 29, pp. 679-690, 2003.

The performance results were obtained via experiments run on two different hardware platforms, referred to herein as clusters or cluster platforms. The two clusters had similar compute nodes but different interconnect fabrics. While both clusters used InfiniBand® as their interconnect backbone, the first cluster used a fat-tree topology, whereas the second cluster used a 3-D torus. The former offers an aggregated peak bandwidth that scales linearly up to 32 nodes, while the bandwidth scalability of the latter becomes more challenged at 32 nodes and beyond. The configurations of the two clusters are provided in Table 1.

TABLE 1

| Compute Node | |
|---|---|
| Sock. × core × smt | 2 × 8 × 2 |
| SIMD width | 8 (single precision), 4 (double precision) |
| Clock (GHz) | 2.60 |
| Micro-architecture | Intel Xeon E5-2670 |
| DP GFLOPS | 330 |
| L1/L2/L3 Cache (KB) | 64/256/20,480, L1/L2: core, L3: socket |
| DRAM (GB) | 64 |
| Interconnect | |
| Fabric | QDR InfiniBand 4× |
| Topology | First cluster: Two-level 14-ary fat tree |
| | Second cluster: 4-ary 3-D torus, concentration factor 16 |
| Libraries | |
| SOI | 8 segment/process, β = 1/4, SNR = 290 dB |
| MKL | v10.3, 2 processes per node MPI + OpenMP |
| FFTE | used in HPCC 1.4.1 |
| FFTW | v3.3, MPI + OpenMP and FFTW MEASURE |

Performance tests were done using a weak scaling model and $2^{28}$ double-precision complex data points per node. Performance is reported in GFLOPS, which is 5N log N divided by execution time. The numbers reported correspond to the maximum performance observed among ten or more runs per problem-size/number-of-nodes/software choice. To be conservative, at least three times as many runs were made on non-SOI FFT procedures per problem-size/number-of-nodes than on the disclosed SOI FFT procedure.

The signal-to-noise (SNR) ratio of a double-precision implementation of the disclosed SOI procedure was approximately 290 dB, which is 20 dB (one digit) lower than the other FFT procedures (e.g., Intel MKL, FFTW, etc.). This slight decrease of accuracy is expected as the disclosed SOI procedure uses an underlying FFT as a building block and incurs a small amount of additional error due to the condition number κ, as well as an increased number of floating-point operations. The B value is set to 72 for a pair of (τ, σ) parameters according to the procedure described above.

Figure 11:
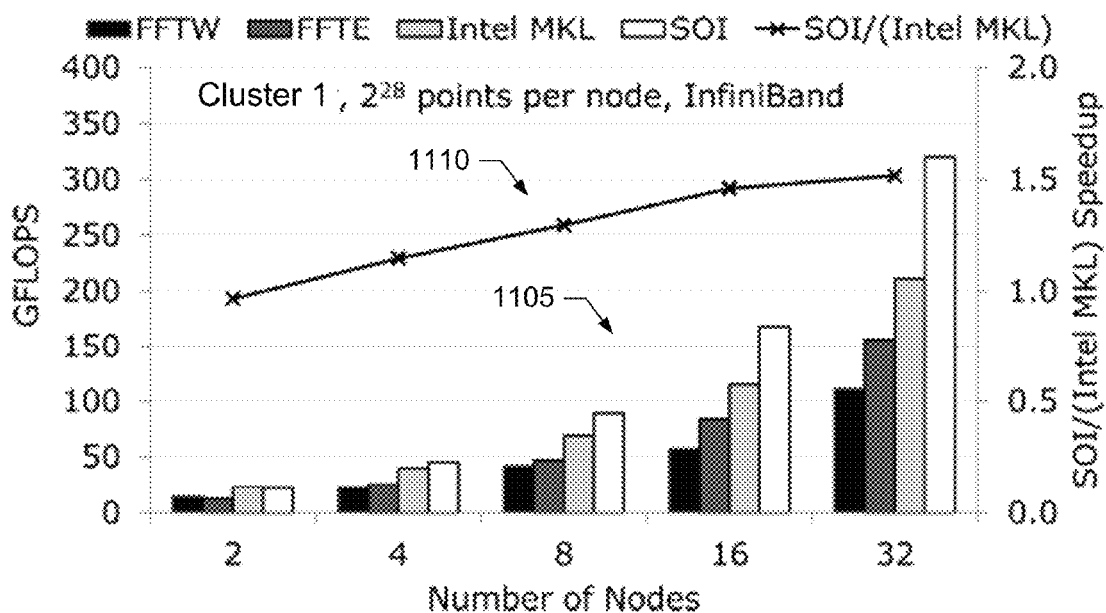
FIGS. 11-15 provide example performance results for the distributed FFT processor of FIG. 3.

FIG. 11 presents the set of comparisons on the first cluster platform with a fat-tree InfiniBand interconnect. The bar graph 1105 in FIG. 11 shows the best performance among multiple runs in GFLOPS calibrated by the left y-axis. The line graph 1110, calibrated by the right y-axis, shows the speed up of the disclosed SOI FFT procedure over the Intel MKL procedure, which was the fastest among the non-SOI algorithms. In FIG. 11, the advantage of the disclosed SOI FFT procedure is apparent despite the relatively high scalability of the interconnect fabric.

Figure 12:
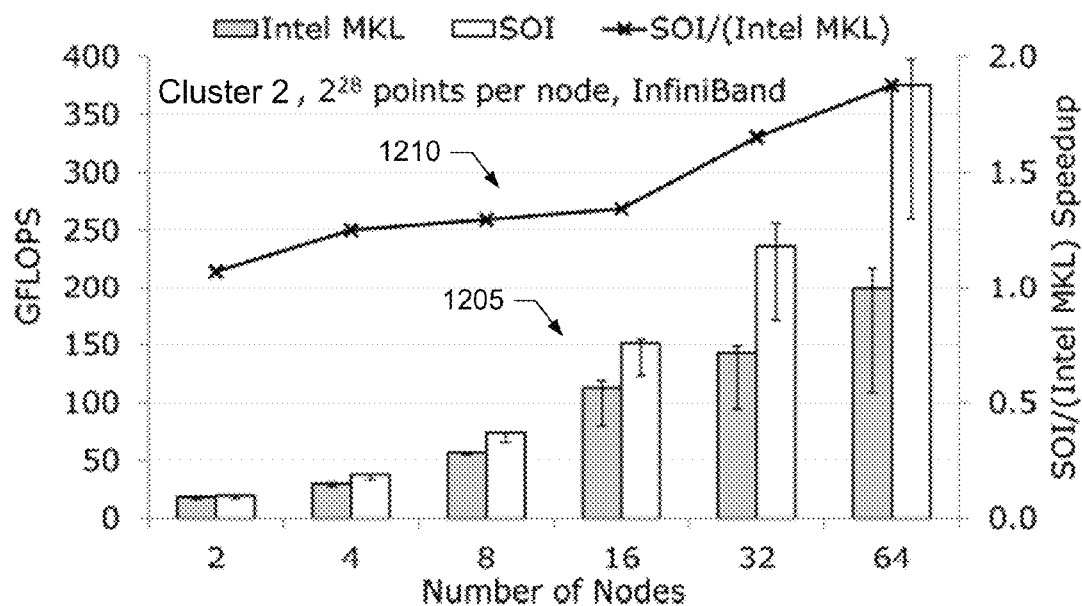
Figure 13:
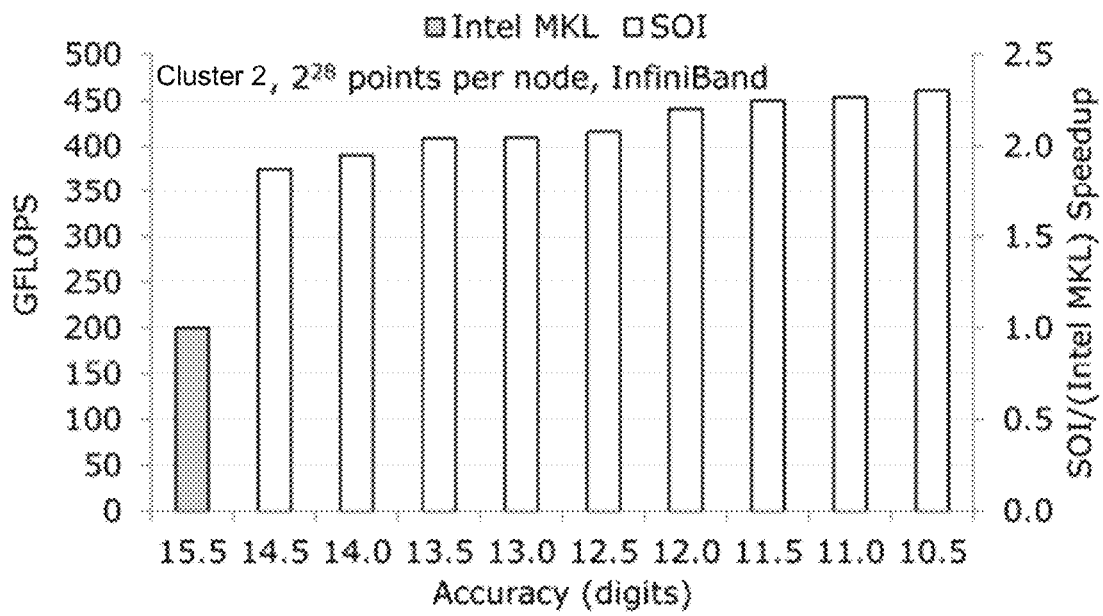

FIG. 12 presents a performance comparison between the Intel MKL FFT procedure and the disclosed SOI FFT procedure on the second cluster platform. The bar graph 1205 shows the best performance among multiple runs in GFLOPS calibrated by the left y-axis. Due to a large range of reported performance, the 90% confidence interval based on a normal distribution is included in the graph. The line graph 1210, calibrated by the right y-axis, shows the speed up of the disclosed SOI FFT procedure over the Intel MKL procedure on the second cluster platform. Note the additional performance gain over the first cluster performance from 32 nodes onwards. This behavior is consistent with the narrower bandwidth due to a 3-D torus topology.

Distributed FFT processing as disclosed herein (e.g., the disclosed SOI FFT procedure in the performance results) has a unique capability of trading accuracy for speed. By allowing the condition number κ (of the W matrix) to gradually increase, faster-decay convolution window functions w can be obtained, which in turn leads to a smaller B values. FIG. 12 illustrates this capability using 64 nodes on the second cluster platform. The bar graph of FIG. 12 shows performance and speed up, calibrated by the left and right y-axes, respectively. As a reference, the Intel MKL FFT procedure typically offers a SNR value of 310 dB, corresponding to about 15.5 digits. The full-accuracy of the disclosed SOI FFT procedure is about 14.5 digits. FIG. 12 shows the additional performance gain as the accuracy requirement is relaxed. This feature offered by SOI may be exploited in various applications. For example, it is plausible that a 10-digit-accurate FFT suffices for many applications. Furthermore, in the context of iterative algorithms where the FFT is computed in an inner loop, full accuracy is typically unnecessary until very late in the iterative process. Note also that at an accuracy level of 10 digits, the disclosed SOI FFT procedure outperforms Intel MKL FFT procedure by more than twofold.

Figure 14:
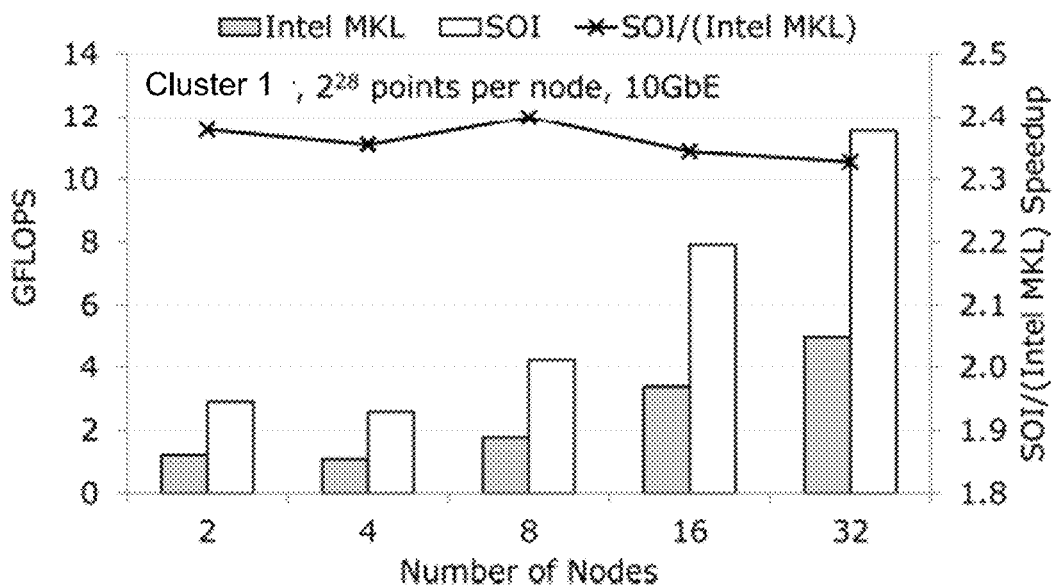

At least two factors can contribute to the speed advantage of the disclosed SOI FFT procedure. First, disclosed SOI FFT involves just one all-to-all communication operation, whereas the prior FFT procedures involve three all-to-all communication operations. In the situation where communication is much slower than computation, the disclosed SOI FFT procedure at an oversampling rate of 1+β can outperform prior FFT procedures by about a factor of 3/(1+β). FIG. 14 illustrates the low-communication advantage of the disclosed SOI FFT procedure over prior FFT procedure that involve three all-to-all communication operations. On the second cluster platform with a 10 Gigabit Ethernet interconnect, the disclosed SOI FFT procedure, with 25% oversampling, has a speedup advantage in the interval [2.3,2.4], which is near the theoretical value of 3/(1+β)=3/1.25=2.4.

Second, convolution can be implemented with relatively high computation efficiency. As described above, convolution represents an extra arithmetic cost associated with the disclosed SOI FFT procedure. In a test of $2^{28}$ data points per node and running the disclosed SOI FFT procedure to full accuracy on 32 nodes, the arithmetic operations involved in convolution are almost fourfold that of a prior FFT procedures. In other words, such an SOI FFT implementation may be about fivefold as expensive in terms of arithmetic operations count. Fortunately, while the FFT's computational efficiency can be low, often hovering around 10% of a machine's peak performance, convolution is quite amenable to programming optimization, as described above. In one such implementation, convolution computation reaches about 40% of the processor's peak performance. That is consistent with other profiling data, which indicates that the total convolution time in the disclosed SOI FFT procedure is about the same as that of the FFT computation time within the disclosed SOI FFT procedure. Thus, the full-accuracy SOI FFT procedure implementation takes about twice, not five times, as much computation time as prior FFT procedures. However, as shown above, this penalty may be more than offset by the savings in communication time.

The execution time of the disclosed SOI FFT procedure and of the Intel MKL FFT procedure, the latter being representative of a non-SOI algorithm, can be modeled. Consider the problem size of $N=2^{28}n$, where n is the number of processor nodes. Furthermore, let the nodes be connected by a k-ary 3-D torus with a concentration factor of 16 (i.e., 16 compute nodes connected to one switch), giving the relationship of $n=16k^3$. As functions of n, let $T_{fft}(n)$ and $T_{conv}(n)$ denote, respectively, the execution time of node-local FFT and convolution computations, and let $T_{mpi}(n)$ be the latency of one all-to-all exchange of N data points. Each of these functions is modeled as follows.

On the one hand, $T_{fft}(1)$ for the Intel MKL FFT procedure can be measured, and on the other hand, $T_{fft}(1)$ is given by $$T_{fft}(1)=O(2^{28}\log(2^{28}))=\alpha\log(2^{28}).\quad\text{Equation 38}$$

The parameter α can be obtained through the measured execution time. At n nodes, $T_{fft}(n)$ can be modeled by $O(2^{28}n\log(2^{28}n))/n$ and, thus:

$$T_{fft}(n)\approx\alpha(\log(2^{28})+\log(n)).\quad\text{Equation 39}$$

Next, because node-local convolution involves O(MB) operations, where M is the number of data points per node, $T_{conv}(n)$ remains roughly constant regardless of n in the weak scaling scenario. Letting $T_{conv}$ be the time measured from running the SOI FFT procedure, $T_{conv}(n)$ is modeled by $cT_{conv}$ where c lies in the range [0.75,1.25], reflecting possible deviation from $T_{conv}$ one way or the other. Next, consider $T_{mpi}(n)$. Using the second cluster platform as a reference, switch-to-switch (global) channels are modeled with three 4×QDR InfiniBand links, and node-to-switch (local) channels are modeled with one 4×QDR InfiniBand link. It is assumed that the theoretical peak bandwidths of 120 Gbit/s for global channels and 40 Gbit/s for local channels are achieved. The MPI communication time is bounded by the local channel bandwidths for n≤128, or by the bisection bandwidth otherwise. The communication time bound is computed from the bisection bandwidth as (Data transferred across a bisection)/(Bisection bandwidth), where (Data transferred across a bisection)=(the total data transferred)/2 due to symmetry and (Bisection bandwidth)=4n/k. These parameters yield specific values for $T_{mpi}(n)$.

Putting the foregoing parameters together yields the model:

$$T_{soi}(n)\approx T_{fft}((1+\beta)/n)+cT_{conv}+(1+\beta)T_{mpi}(n),\quad\text{Equation 40}$$

and because:

$$T_{mkl}(n)\approx T_{fft}(n)+3T_{mpi}(n),\quad\text{Equation 41}$$

it can be shown that:

$$\text{speedup}(n)\approx\frac{T_{fft}(n)+3T_{mpi}(n)}{T_{fft}((1+\beta)n)cT_{conv}+(1+\beta)T_{mpi}(n)}.\quad\text{Equation 42}$$

Figure 15:
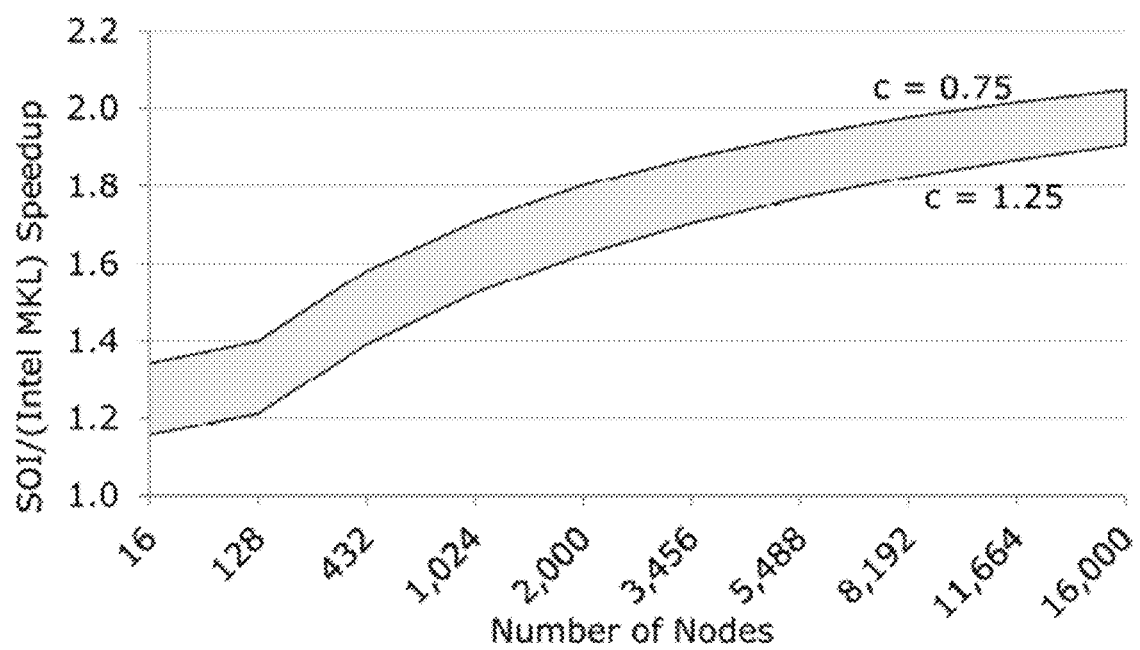

FIG. 15 illustrates a resulting speedup projection of the disclosed SOI FFT procedure over the Intel MKL FFT procedure for a hypothetical 3-D torus network. This projection is relevant as 3-D torus networks can be found in existing supercomputers.

Based on the foregoing description, distributed FFT processing as disclosed herein and performed by the distributed FFT processor 300 is based on a novel, disclosed FFT framework that provides a class of approximation-based DFT factorizations. Example distributed processing implementations, such as those illustrated by the mathematical expression 500 of FIG. 5 and Equation 36, and the example parallel processing implementation 900 of FIG. 9, are based on these factorizations. Distributed FFT processing, as disclosed herein, may have many desirable properties, such as being efficient (e.g., in the form of communication cost savings), and versatile (e.g., by supporting many design choices, such as window function, oversampling rate, and accuracy-performance tradeoff).

In distributed FFT processing, as disclosed herein, the choice of window function is a design consideration and determines, among other things, the condition number κ and aliasing error $\epsilon^{(alias)}$. These two parameters can control the accuracy that is achievable by the distributed FFT processor 300. An example window function, ŵ, is described above in the context of Equation 13 through Equation 15. Other example window functions can have κ≈1 and $\epsilon^{(alias)}$ close to machine roundoff while β is kept small (e.g., at ¼). For example, a window function based on the one-parameter Gaussian function, $\exp(-\sigma t^2)$, can have accuracy of 10 digits if oversampling factor β is kept at ¼. Achieving full double-precision accuracy with such a window function involves setting the oversampling factor β to be 1. Another kind of window functions, ŵ, with compact support can reduce or eliminate aliasing error and may be desirable for some applications. In some examples, the approximate DFT factorizations described above on which the distributed FFT processing disclosed herein is based (e.g., see the mathematical expression 500 of FIG. 5 and Equation 36) can be made exact with such window functions.

For example, consider a window function ŵ that is 1 on [0, M-1] and zero outside (-1, M). With no oversampling or truncation, the distributed FFT processing framework disclosed herein corresponds to an exact factorization given by:

$$F_N=(I_P\otimes F_M)P_{erm}^{P,N}(I_M\otimes F_P)W^{(exact)}.\quad\text{Equation 43}$$

In Equation 43, the entries of the convolution matrix $W^{(exact)}$ are the elements $c_{jk}$ of Equation 17, which for this example window function are given by:

$$c_{jk}=\frac{1}{M}\sum_{l=-\infty}^{\infty}w\left(\left(\frac{j}{M}-\frac{k}{N}\right)-l\right)\quad\text{Equation 44}$$

$$= \frac{1}{M} \sum_{l=-\infty}^{\infty} \exp(i2\pi l(j/M - k/N)) \hat{w}(l)$$

$$= \frac{1}{M} \sum_{l=0}^{M-1} w^l.$$

In Equation 44, $w = e^{i2\pi(j/M - k/N)}$.

The hybrid convolution theorem of Equation 6 is also a basis of the distributed FFT processing framework disclosed herein. A proof of the hybrid convolution theorem of Equation 6 is as follows. Let $y = F_N x$, $$\tilde{x} = \frac{1}{M} Samp(x * w; 1/M),$$

and $\tilde{y} = F_M \tilde{x}$. The proof of the hybrid convolution theorem involves proving that $\tilde{y} = \text{Peri}(y \cdot \hat{w}; M)$. To develop the proof, consider the Poisson Summation Formula (PSF) given by:

$$\sum_{n=-\infty}^{\infty} w(n + \alpha) = \sum_{n=-\infty}^{\infty} \hat{w}(n) e^{i2\pi \alpha n}. \quad \text{Equation 45}$$

Equation 45 holds for window functions $w$ and $\hat{w}$ having the Properties 1, 2 and 3 described above, and any fixed $\alpha$ that is a real number. Starting from $$\tilde{x} = \frac{1}{M} Samp(x * w; 1/M),$$

and then rearranging sums and applying the PSF gives:

$$\tilde{x}_j = \frac{1}{M} \sum_{l=-\infty}^{\infty} w\left(\frac{j}{M} - \frac{l}{M}\right) x_l \quad \text{Equation 46}$$

$$= \frac{1}{M} \sum_{l=0}^{N-1} x_l \sum_{p=-\infty}^{\infty} w\left(\frac{j}{M} - \frac{pN + l}{N}\right)$$

$$= \frac{1}{M} \sum_{l=0}^{N-1} x_l \sum_{p=-\infty}^{\infty} \hat{w}(p) e^{i2\pi\left(\frac{j}{M} - \frac{l}{N}\right)p}$$

$$= \frac{1}{M} \sum_{p=-\infty}^{\infty} \hat{w}(p) e^{i2\pi jp/M} \sum_{l=0}^{N-1} x_l e^{-i2\pi lp/N}$$

$$= \frac{1}{M} \sum_{p=-\infty}^{\infty} y_p \hat{w}(p) e^{i2\pi jp/M}.$$

The last line of Equation 46 holds because $y = F_N x$. Next, $\tilde{y} = F_M \tilde{x}$ can be rewritten as:

$$\tilde{y}_l = \sum_{j=0}^{M-1} \tilde{x}_j e^{-i2\pi jk/M} \quad \text{Equation 47}$$

$$= \frac{1}{M} \sum_{j=0}^{M-1} e^{-i2\pi jk/M} \sum_{p=-\infty}^{\infty} y_p \hat{w}(p) e^{i2\pi jp/M}$$

$$= \frac{1}{M} \sum_{p=-\infty}^{\infty} y_p \hat{w}(p) \sum_{j=0}^{M-1} e^{-i2\pi j(k-p)/M}$$

$$= \frac{1}{M} \sum_{p=-\infty}^{\infty} \sum_{m=0}^{M-1} y_{pM+m} \hat{w}(pM + m) A_{k,m}.$$

In Equation 47, the quantity $A_{k,m}$ is given by:

$$A_{k,m} = \sum_{j=0}^{M-1} e^{-i2\pi j(k-m)/M} \quad \text{Equation 48}$$

$$= \begin{cases} M & \text{if } m = k, \\ 0 & \text{otherwise.} \end{cases}$$

Consequently, $$\tilde{y}_k = \sum_{p=-\infty}^{\infty} y_p M + k \hat{w}(pM+k). \quad \text{Equation 49}$$

Equation 49 corresponds to $\tilde{y} = \text{Peri}(y \cdot \hat{w}; M)$, which completes the proof of the hybrid convolution theorem.

Figure 16:
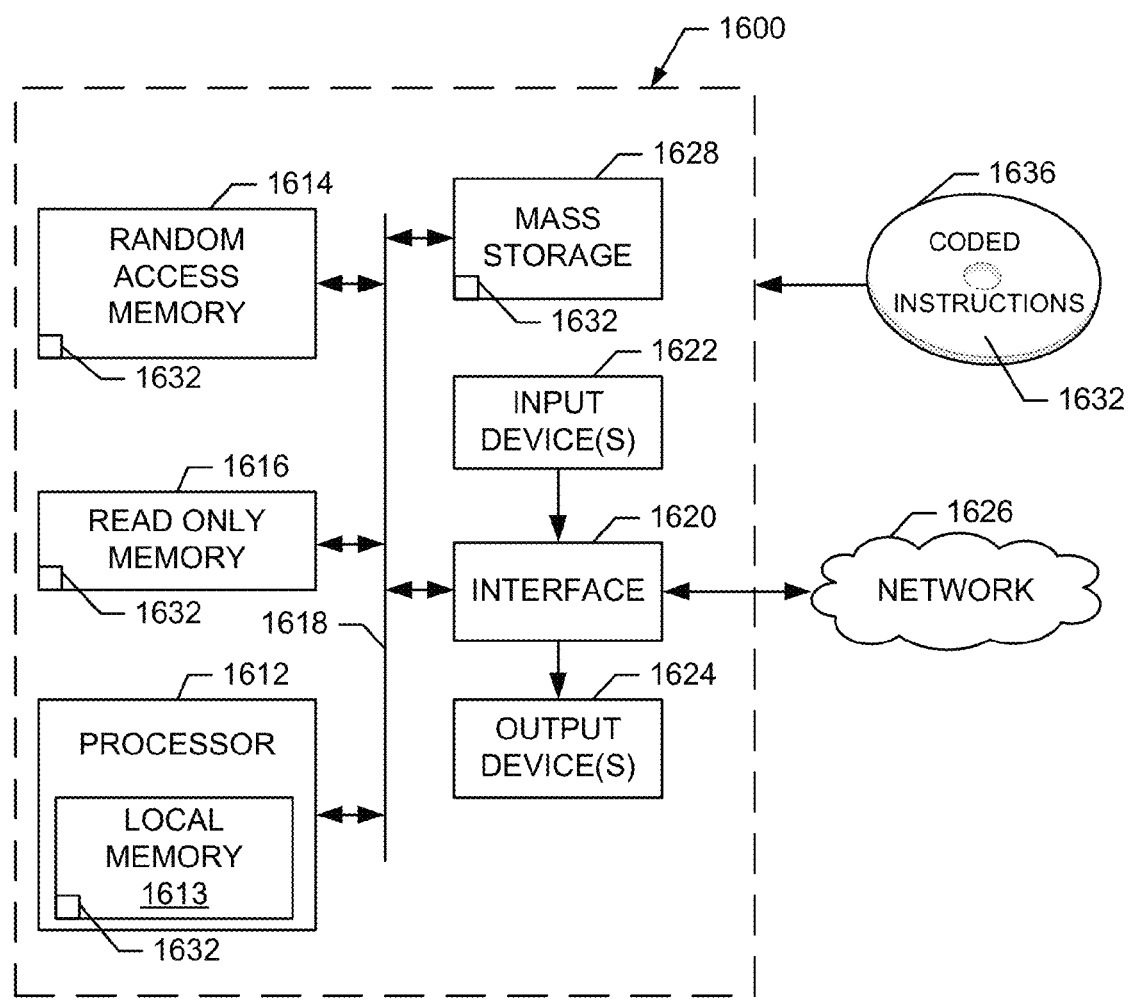
FIG. 16 is a block diagram of an example processing system that may execute the example machine readable instructions of FIG. 10 to implement the distributed FFT processor of FIG. 3.

FIG. 16 is a block diagram of an example processing system 1600 capable of executing the instructions of FIG. 10 to implement the example distributed FFT processor 300, the example input interface 105, the example processor nodes 110A-B, the example communication interface 115, the example output interface 120, the example window convolver 305, the example FFT processor 310, the example data discarder 315, the example data demodulator 320 and/or the example data permutator 325 of FIGS. 1, 3-9. The processing system 1600 can be, for example, a server, a personal computer, a mobile device (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 1600 of the instant example includes a processor 1612. For example, the processor 1612 can be implemented by one or more microprocessors and/or controllers from any desired family or manufacturer.

The processor 1612 includes a local memory 1613 (e.g., a cache) and is in communication with a main memory including a volatile memory 1614 and a non-volatile memory 1616 via a link 1618, which can include a bus, one or more point-to-point connections, or a combination thereof. The volatile memory 1614 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processing system 1600 also includes an interface circuit 1620. The interface circuit 1620 may be implemented by any type of interface standard, such as an Ethernet interface, a universal serial bus (USB), and/or a PCI express interface.

One or more input devices 1622 are connected to the interface circuit 1620. The input device(s) 1622 permit a user to enter data and commands into the processor 1612. The input device(s) can be implemented by, for example, a keyboard, a mouse, a touchscreen, a track-pad, a trackball, a trackbar (such as an isopoint), a voice recognition system and/or any other human-machine interface.

One or more output devices 1624 are also connected to the interface circuit 1620. The output devices 1624 can be implemented, for example, by display devices (e.g., a liquid crystal display, a cathode ray tube display (CRT)), a printer and/or speakers. The interface circuit 1620, thus, typically includes a graphics driver card.

The interface circuit 1620 also includes a communication device, such as a modem or network interface card, to facilitate exchange of data with external computers via a network 1626 (e.g., an Ethernet connection, a digital subscriber line (DSL), a telephone line, coaxial cable, a cellular telephone system, etc.).

The processing system 1600 also includes one or more mass storage devices 1628 for storing machine readable instructions and data. Examples of such mass storage devices 1628 include floppy disk drives, hard drive disks, compact disk drives and digital versatile disk (DVD) drives.

Coded instructions 1632 corresponding to the instructions of FIG. 10 may be stored in the mass storage device 1628, in the volatile memory 1614, in the non-volatile memory 1616, in the local memory 1613 and/or on a removable storage medium, such as a CD or DVD 1636.

As an alternative to implementing the methods, apparatus and/or apparatus described herein in a system such as the processing system of FIG. 16, the methods and or apparatus described herein may be embedded in a structure such as a processor and/or an ASIC (application specific integrated circuit).

Finally, although certain example methods, apparatus, systems and articles of manufacture have been described herein, the scope of coverage of this patent is not limited thereto. On the contrary, this patent covers all methods, apparatus, systems and articles of manufacture fairly falling within the scope of the appended claims either literally or under the doctrine of equivalents.

What is claimed is:

1. A method to compute a Fourier transform of an input data sequence, the method comprising:
   performing first processing on the input data sequence using a plurality of processors, the first processing producing an output data sequence having more data elements than the input data sequence, a number of data elements in the output data sequence being based on an oversampling parameter associated with the first processing; and
   performing second processing on the output data sequence using the plurality of processors, the output data sequence being permutated among the plurality of processors, respective ones of the processors performing the second processing on respective permutated portions of the output data sequence to determine respective, ordered segments of the Fourier transform of the input data sequence, wherein the input data sequence is received by the method in-order, the Fourier transform of the input data sequence is output by the method in-order, and the method further includes performing only one global data transpose between the first processing and the second processing.

2. A method as defined in claim 1, wherein the performing of the first processing on the input data sequence includes:
   convolving the input sequence with a window function; and
   performing Fourier transforms on respective segments of a second output data sequence resulting from convolving the input sequence with the window function.

3. A method as defined in claim 2, wherein the window function is specified by an alias error and a condition number, and an accuracy of the Fourier transform of the input data sequence is based on the alias error, the condition number and the oversampling parameter associated with the first processing.

4. A method as defined in claim 1, wherein a first one of the plurality of processors performs the first processing on a first segment of the input data sequence, the output data sequence includes a first output data sequence resulting from the first processing performed by the first one of the plurality of processors, and the first output data sequence includes more data elements than are in the first segment of the input data sequence.

5. A method as defined in claim 1, wherein the performing of the second processing includes:
   performing respective Fourier transforms on the respective permutated portions of the output data sequence; and
   demodulating, based on a window function, respective second output data sequences resulting from performing the respective Fourier transforms on the respective permutated portions of the output data sequence.

6. A method as defined in claim 5, wherein the performing of the second processing further includes discarding a portion of a first one of the second output data sequences prior to demodulating the first one of second output data sequences based on the window function, the portion of the first one of second output data sequences corresponding to the oversampling parameter associated with the first processing.

7. A tangible machine readable storage medium comprising machine readable instructions which, when executed, cause a plurality of processors to at least:
   perform first processing on an input data sequence, the first processing to produce in an output data sequence having more data elements than the input data sequence, a number of data elements in the output data sequence being based on an oversampling parameter associated with the first processing; and
   perform second processing on the output data sequence, the output data sequence permutated among the plurality of processors, respective ones of the processors to perform the second processing on respective permutated portions of the output data sequence to determine respective, ordered segments of the Fourier transform of the input data sequence, wherein the input data sequence is received by the plurality of processors in-order, the Fourier transform of the input data sequence is output by the plurality of processors in-order, and the instructions, when executed, cause the plurality of processors to perform only one global data transpose between the first processing and the second processing.

8. A tangible machine readable storage medium as defined in claim 7, wherein to perform the first processing, the instructions, when executed, cause the plurality of processors to:
   convolve the input sequence with a window function; and
   perform Fourier transforms on respective segments of a second output data sequence resulting from convolving the input sequence with the window function.

9. A tangible machine readable storage medium as defined in claim 8, wherein the window function is specified by an alias error and a condition number, and an accuracy of the Fourier transform of the input data sequence is based on the alias error, the condition number and the oversampling parameter associated with the first processing.

10. A tangible machine readable storage medium as defined in claim 7, wherein the instructions, when executed, cause a first one of the plurality of processors to perform the first processing on a first segment of the input data sequence, the output data sequence includes a first output data sequence resulting from the first processing performed by the first one of the plurality of processors, and the first output data sequence is to include more data elements than are in the first segment of the input data sequence.

11. A tangible machine readable storage medium as defined in claim 7, wherein to perform the second processing, the instructions, when executed, cause a first one of the plurality of processors to:
perform a Fourier transform on a first permutated portion of the output data sequence; and
demodulate, based on a window function, a second output data sequence resulting from performing the Fourier transform on the first permutated portion of the output data sequence.

12. A tangible machine readable storage medium as defined in claim 11, wherein the instructions, when executed, further cause the first one of the plurality of processors to discard a portion of the second output data sequence prior to demodulating the second output data sequence based on the window function, the portion of the second sequence of data corresponding to the oversampling parameter associated with the first processing.

13. A system to compute a Fourier transform of an input data sequence, the system comprising:
memory including instructions;
a plurality of processors to execute the instructions to:
perform first processing on an input data sequence, the first processing to produce an output data sequence having more data elements than the input data sequence; and
perform second processing on the output data sequence, the output data sequence to be permutated among the plurality of processors, respective ones of the processors to perform the second processing on respective permutated portions of the output data sequence to determine respective, ordered segments of the Fourier transform of the input data sequence; and
a communication interface to permit permutation of the output data sequence among the plurality of processors, the processors to perform only one global data transpose when permutating the output data sequence among the plurality of processors to determine the Fourier transform of the input data sequence.

14. A system as defined in claim 13, wherein to perform the first processing, the plurality of processors is to:
convolve the input sequence with a window function; and
perform Fourier transforms on respective segments of a second output data sequence resulting from convolving the input sequence with the window function.

15. A system as defined in claim 14, wherein the window function is specified by an alias error and a condition number, and an accuracy of the Fourier transform of the input data sequence is based on the alias error, the condition number and an amount of data oversampling exhibited by the first processing.

16. A system as defined in claim 13, wherein a first one of the plurality of processors is to perform the first processing on a first segment of the input data sequence, the output data sequence includes a first output data sequence resulting from the first processing performed by the first one of the plurality of processors, and the first output data sequence is to include more data elements than are in the first segment of the input data sequence.

17. A system as defined in claim 13, wherein the input data sequence is received by the system in-order, and the Fourier transform of the input data sequence is output by the system in-order.

18. A system as defined in claim 13, wherein to perform the second processing, a first one of the plurality of processors is to:
perform a Fourier transform on a first permutated portion of the output data sequence; and
demodulate, based on a window function, a second output data sequence resulting from performing the Fourier transform on the first permutated portion of the output data sequence.

19. A system as defined in claim 18, wherein the first one of the plurality of processors is further to discard a portion of the second output data sequence prior to demodulating the second output data sequence based on the window function, the portion of the second sequence of data corresponding to an amount of data oversampling associated with the first processing, the data oversampling resulting in the output data sequence having more data elements than the input data sequence.

* * * * *